(12) United States Patent
Tsunoya

(10) Patent No.: US 11,759,856 B2
(45) Date of Patent: Sep. 19, 2023

(54) METHOD FOR MANUFACTURING THREE-DIMENSIONAL SHAPED OBJECT

(71) Applicant: Seiko Epson Corporation, Tokyo (JP)

(72) Inventor: Akihiko Tsunoya, Okaya (JP)

(73) Assignee: SEIKO EPSON CORPORATION

( * ) Notice: Subject to any disclaimer, the term of this patent is extended or adjusted under 35 U.S.C. 154(b) by 164 days.

(21) Appl. No.: 16/891,220

(22) Filed: Jun. 3, 2020

(65) Prior Publication Data
US 2020/0384532 A1    Dec. 10, 2020

(30) Foreign Application Priority Data

Jun. 4, 2019 (JP) .................... 2019-104604

(51) Int. Cl.
| | | |
|---|---|---|
| *B33Y 10/00* | (2015.01) | |
| *B22F 3/10* | (2006.01) | |
| *B28B 1/00* | (2006.01) | |
| *B33Y 40/20* | (2020.01) | |
| *B29C 64/40* | (2017.01) | |
| *B29C 64/165* | (2017.01) | |
| *B22F 10/43* | (2021.01) | |
| *B22F 10/18* | (2021.01) | |
| *B22F 12/33* | (2021.01) | |
| *B22F 12/37* | (2021.01) | |
| *B22F 12/00* | (2021.01) | |
| *B22F 12/53* | (2021.01) | |
| *B22F 10/62* | (2021.01) | |
| *B22F 10/64* | (2021.01) | |

(52) U.S. Cl.
CPC ............ *B22F 3/1021* (2013.01); *B22F 10/43* (2021.01); *B28B 1/001* (2013.01); *B29C 64/165* (2017.08); *B29C 64/40* (2017.08); *B33Y 10/00* (2014.12); *B33Y 40/20* (2020.01); *B22F 10/18* (2021.01); *B22F 10/62* (2021.01); *B22F 10/64* (2021.01); *B22F 12/33* (2021.01); *B22F 12/37* (2021.01); *B22F 12/38* (2021.01); *B22F 12/53* (2021.01)

(58) Field of Classification Search
CPC ....... B22F 3/1021; B33Y 10/00; B33Y 40/20; B29C 64/40; B29C 64/165; B28B 1/001
See application file for complete search history.

(56) References Cited

U.S. PATENT DOCUMENTS

| | | | |
|---|---|---|---|
| 10,486,364 B2 * | 11/2019 | Mandel | ................. B29C 64/264 |
| 2017/0014950 A1 | 1/2017 | Okada | |
| 2017/0217097 A1 | 8/2017 | Okamoto et al. | |
| 2017/0326752 A1* | 11/2017 | Osawa | .................... G06T 19/20 |

(Continued)

FOREIGN PATENT DOCUMENTS

| | | | | |
|---|---|---|---|---|
| CN | 106270512 A | * | 1/2017 | ............ B22F 3/1055 |
| CN | 106270512 A | | 1/2017 | |

(Continued)

*Primary Examiner* — Yung-Sheng M Tsui
(74) *Attorney, Agent, or Firm* — Harness, Dickey & Pierce, P.L.C.

(57) ABSTRACT

A method for manufacturing a three-dimensional shaped object includes a structure shaping step (step S140) of shaping a structure with a shaping material including a metal powder or a ceramic powder, a support shaping step (step S130) of shaping a support T that supports a structure S with a support material including a resin, and a deresining step (step S210) of deresining the support T supporting the structure S.

5 Claims, 21 Drawing Sheets

(56) References Cited

U.S. PATENT DOCUMENTS

| | | |
|---|---|---|
| 2018/0056593 A1 | 3/2018 | Ochi et al. |
| 2018/0154441 A1 | 6/2018 | Miller et al. |
| 2021/0154891 A1 | 5/2021 | Okamoto et al. |

FOREIGN PATENT DOCUMENTS

| | | |
|---|---|---|
| JP | 2003-013107 A | 1/2003 |
| JP | 2015-136915 A | 7/2015 |
| JP | 2017-132181 A | 8/2017 |
| JP | 2018-034410 A | 3/2018 |
| JP | 2019-005921 A | 1/2019 |
| WO | 2015/141032 A1 | 9/2015 |

\* cited by examiner

METHOD FOR MANUFACTURING THREE-DIMENSIONAL SHAPED OBJECT

The present application is based on, and claims priority from JP Application Serial Number 2019-104604, filed Jun. 4, 2019, the disclosure of which is hereby incorporated by reference herein in its entirety.

BACKGROUND

1. Technical Field

The present disclosure relates to a method for manufacturing a three-dimensional shaped object.

2. Related Art

In the related art, there are various types of methods for manufacturing a three-dimensional shaped object. Among them, there is a method for manufacturing a three-dimensional shaped object that shapes a structure in a state where a support supports the structure. For example, WO2015/141032 discloses that a support layer using a powdery metal material as a support material is used. WO2015/141032 discloses a method for manufacturing a three-dimensional shaped object of supporting a layer of a shaping material, which is the powdery metal material, with the support layer, and shaping a layered shaped object.

However, when a structure having a complicated shape is shaped, the support cannot be removed with the method for manufacturing the three-dimensional shaped object described in WO2015/141032 in the related art.

SUMMARY

A method for manufacturing a three-dimensional shaped object according to the present application includes a structure shaping step of shaping a structure with a shaping material including a metal powder or a ceramic powder, a support shaping step of shaping a support that supports the structure with a support material including a resin, and a deresining step of deresining the support supporting the structure.

DESCRIPTION OF EXEMPLARY EMBODIMENTS

Figure 1:
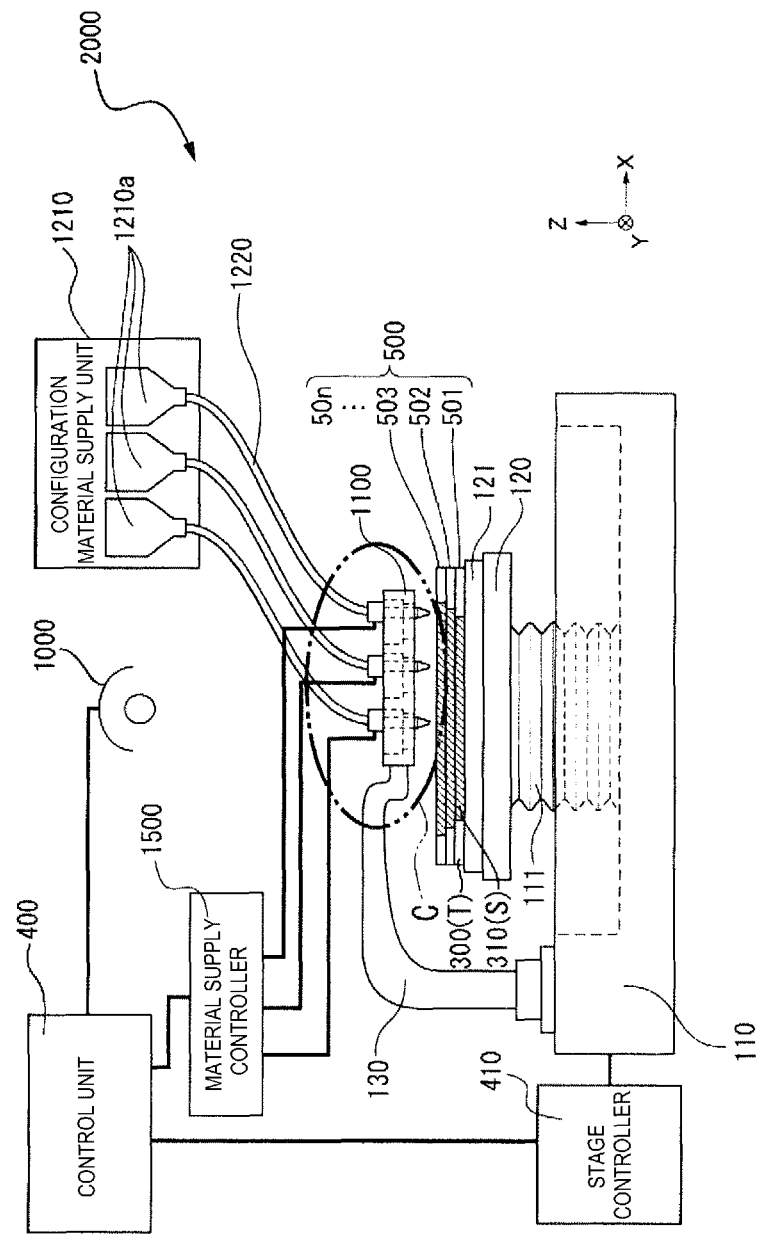
FIG. 1 is a schematic configuration diagram showing a configuration of a manufacturing device for three-dimensional shaped object according to an embodiment capable of performing a method for manufacturing a three-dimensional shaped object according to the present application.

First, the present disclosure will be schematically described.

A method for manufacturing a three-dimensional shaped object according to a first aspect of the present disclosure for solving the above-described problem to be solved includes a structure shaping step of shaping a structure with a shaping material including a metal powder or a ceramic powder, a support shaping step of shaping a support that supports the structure with a support material including a resin, and a deresining step of deresining the support supporting the structure.

According to the present aspect, the support is shaped with the support material including the resin, and the support supporting the structure is deresined. Therefore, by deresining the support, even if the structure has a complicated shape, a possibility that the support cannot be removed can be reduced.

In a method of manufacturing a three-dimensional shaped object according to a second aspect of the present disclosure, in the first aspect, in the structure shaping step, a housing portion is shaped, and a cover portion is shaped in a state where the support is accommodated in the housing portion.

According to the present aspect, the housing portion is shaped, and the cover portion is shaped in the state where the support is accommodated in the housing portion. Therefore, the cover portion can be supported by the support, and deformation of the three-dimensional shaped object can be prevented.

In a method for manufacturing a three-dimensional shaped object according to a third aspect of the present disclosure, in the second aspect, the support is shaped such that the support is accommodated in the housing portion via the support shaping step while the housing portion is shaped in the structure shaping step.

According to the present aspect, in the structure shaping step and the support shaping step, the housing portion and the support are shaped such that the support is accommodated in the housing portion. Therefore, the housing portion can be shaped in a state where the housing portion is supported by the support, and deformation of the housing portion can be prevented.

A method for manufacturing a three-dimensional shaped object according to a fourth aspect of the present disclosure includes, in the second aspect, an accommodating step of accommodating the support shaped via the support shaping step in the housing portion.

According to the present aspect, there is the accommodating step of accommodating the support shaped via the support shaping step in the housing portion. That is, since the structure shaping step and the support shaping step can be performed independently, the structure and the support can be shaped under an optimal condition.

In a method for manufacturing a three-dimensional shaped object according to a fifth aspect of the present disclosure, in the fourth aspect, the support is shaped via the support shaping step at a position different from a shaping position of the housing portion while the housing portion is shaped in the structure shaping step.

According to the present aspect, the support is shaped at the position different from the shaping position of the housing portion in the support shaping step while the housing portion is shaped in the structure shaping step. That is, the structure shaping step and the support shaping step can be performed at the same time, and manufacturing efficiency of the three-dimensional shaped object can be increased.

A method for manufacturing a three-dimensional shaped object according to a sixth aspect of the present disclosure includes, in any one of the first to fifth aspects, a sintering step of sintering the shaping material after the deresining step.

According to the present aspect, since the method includes the sintering step, a high rigidity three-dimensional shaped object in which the metal powder or the ceramic powder is sintered can be shaped.

In a method for manufacturing a three-dimensional shaped object according to a seventh aspect of the present disclosure, in any one of the first to sixth aspects, the deresining step is a step of heating and vaporizing the support.

According to the present aspect, the support can be easily removed by heating and vaporizing the support.

In a method for manufacturing a three-dimensional shaped object according to an eighth aspect of the present disclosure, in any one of the first to sixth aspects, the deresining step is a step of dissolving the support with a solvent.

According to the present aspect, the support can be removed with high precision by dissolving the support with the solvent.

Embodiments of the present disclosure will be described below with reference to the accompanying drawings.

First, an example of a manufacturing apparatus 2000 for three-dimensional shaped object capable of performing the method for manufacturing a three-dimensional shaped object according to the present application will be described with reference to FIGS. 1 to 12. It is needless to say that the method for manufacturing a three-dimensional shaped object according to the present disclosure may be performed by a device for manufacturing a three-dimensional shaped object having a configuration other than the manufacturing apparatus 2000 for three-dimensional shaped object shown in FIGS. 1 to 12.

Figure 2:
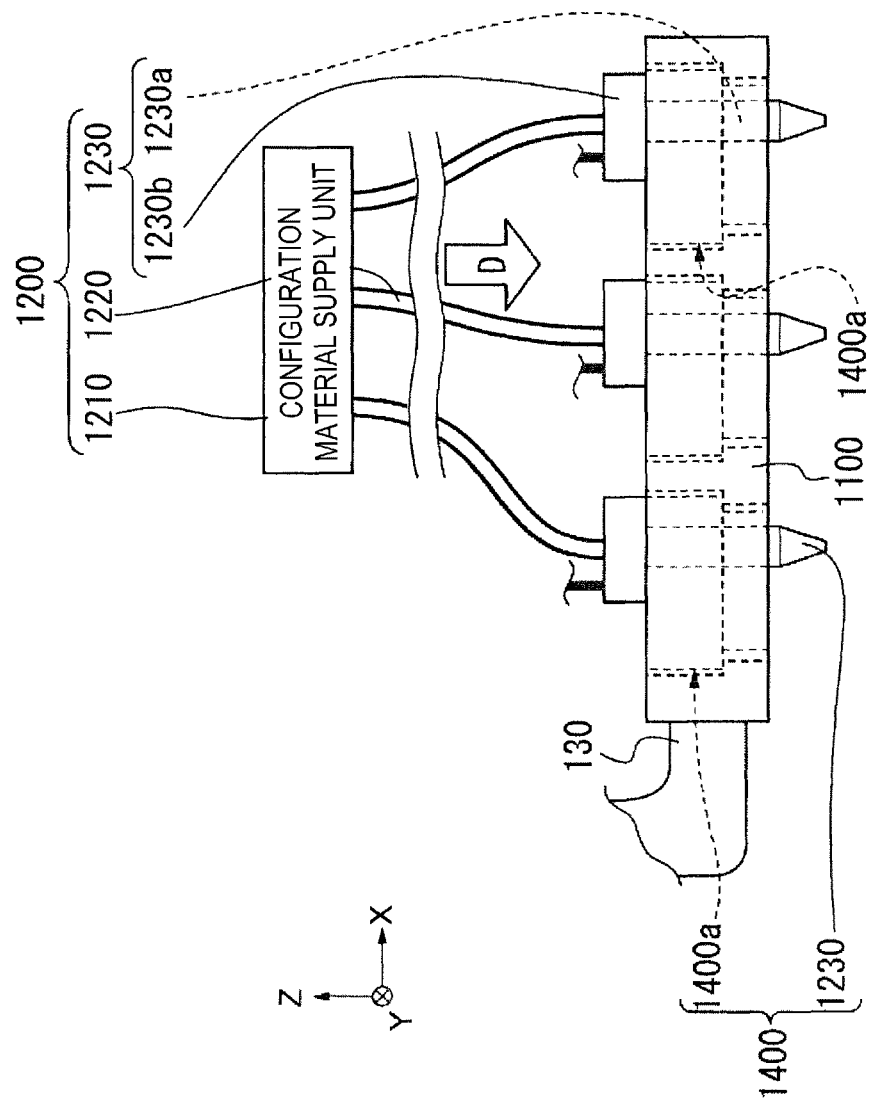
FIG. 2 is an enlarged view of a portion C shown in FIG. 1.
Figure 3:
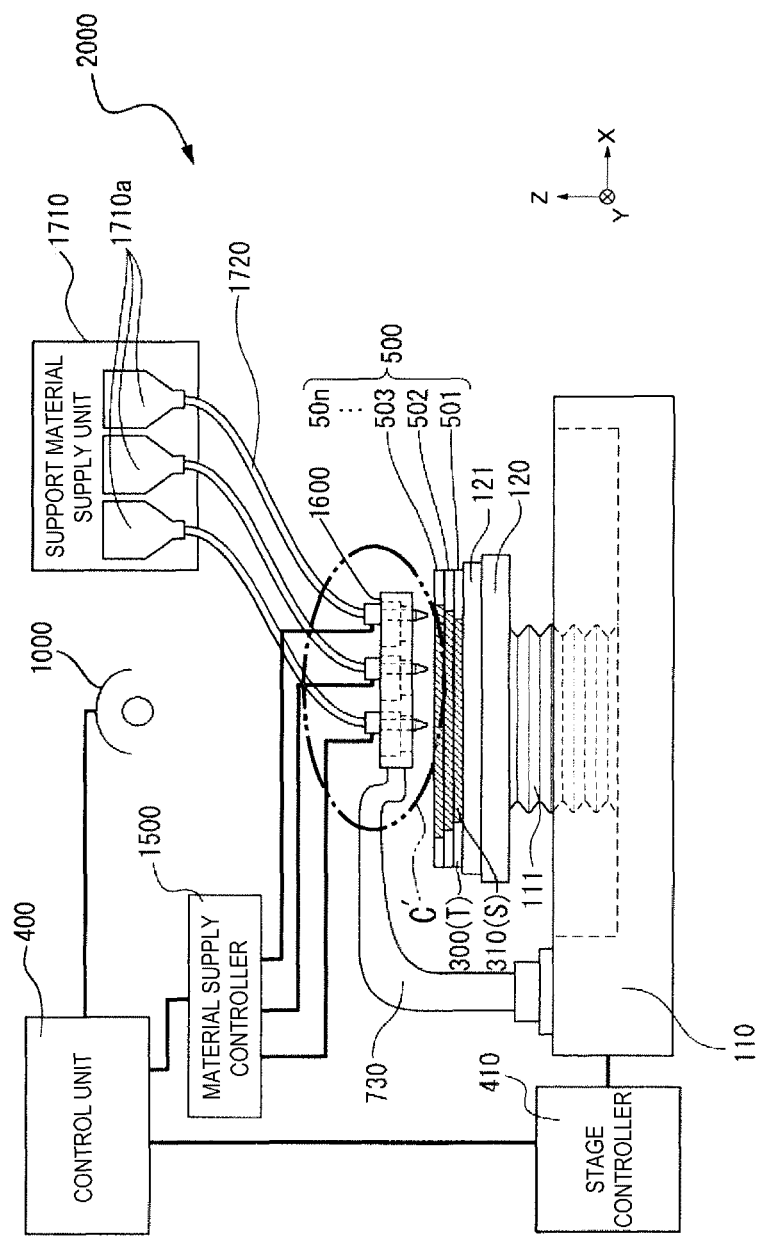
FIG. 3 is a schematic configuration diagram showing components different from those of FIG. 1 in the manufacturing device for three-dimensional shaped object of FIG. 1.
Figure 4:
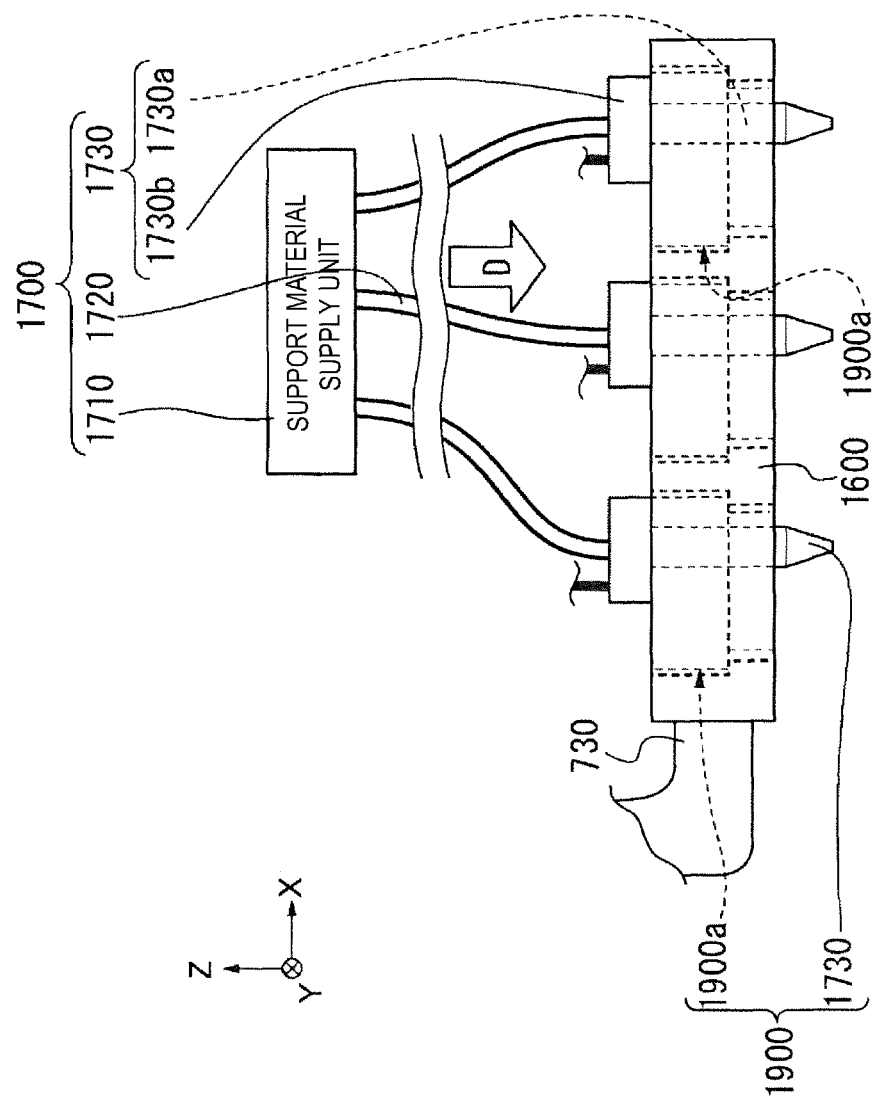
FIG. 4 is an enlarged view of a portion C' shown in FIG. 3.

Herein, the manufacturing device for three-dimensional shaped object according to the present embodiment includes a head base as two types of material supply units. Among them, FIGS. 1 and 2 are diagrams showing only a material supply unit that supplies a paste-like configuration material including the shaping material of the three-dimensional shaped object. Further, FIGS. 3 and 4 are diagrams showing only a material supply unit that supplies a paste-like support material for forming a support layer 300 that supports the configuration material when the three-dimensional shaped object is formed. Herein, the shaping material of the three-dimensional shaped object includes a metal powder or a ceramic powder, and the support material includes a resin.

The manufacturing apparatus 2000 for three-dimensional shaped object shown in FIGS. 1 and 3 includes a base 110 and a stage 120 capable of moving in X, Y, and Z directions shown in the drawings or rotating in a rotation direction about a Z axis by a driving device 111 provided in the base 110 as driving means. Further, as shown in FIGS. 1 and 2, the device includes a head base support unit 130 having one end fixed to the base 110 and the other end on which a plurality of head units 1400 a head base 1100 that holds the head units 1400 are fixed and held, the head units 1400 each including a configuration material discharge unit 1230 that discharges the configuration material. Further, as shown in FIGS. 3 and 4, the device includes a head base support unit 730 having one end fixed to the base 110 and the other end on which a head unit 1900 including a support material discharge units 1730 and a head base 1600 that holds the plurality of head units 1900 are fixed and held, the support material discharge unit 1730 discharging the support material for supporting the three-dimensional shaped object. Herein, the head base 1100 and the head base 1600 are provided in parallel in an XY plane. The configuration material discharge unit 1230 and the support material discharge unit 1730 have a similar configuration. However, the configuration material discharge unit 1230 and the support material discharge unit 1730 are not limited to such a configuration.

On the stage 120, layers 500 including layers 501, 502, 503, . . . , and 50*n* in a process of forming the three-dimensional shaped object is formed. Thermal energy is irradiated by an electromagnetic wave irradiation unit 1000 to form the layers 500 of the three-dimensional shaped object. In order to protect the stage 120 from heat, a sample plate 121 having heat resistance may be used, and the layers 500 of the three-dimensional shaped object may be formed on the sample plate 121. The sample plate 121 of the present embodiment is made of a metal that is robust and easy to manufacture. However, by using, for example, a ceramic plate as the sample plate 121, high heat resistance can be obtained, reactivity with the configuration material of the three-dimensional shaped object to be deresined, sintered, or the like is low, and alteration of the three-dimensional shaped object can be prevented. Although the three layers 501, 502, and 503 are shown in FIGS. 1 and 3 for convenience of description, the layers 501, 502, and 503 are stacked up to a shape of a desired three-dimensional shaped object, that is, up to the layer 50*n* in FIGS. 1 and 3. Herein, each of the layers 501, 502, 503, . . . , and 50*n* includes the support layer 300 formed of the support material discharged from the support material discharge unit 1730 or a structure layer 310 formed of the configuration material discharged from the configuration material discharge unit 1230.

Further, FIG. 2 is an enlarged schematic view of a portion C showing the head base 1100 shown in FIG. 1. As shown in FIG. 2, the plurality of head units 1400 are held in the head base 1100. As will be described in detail later, each of the head units 1400 is configured such that a configuration material discharge unit 1230 included in a configuration material supply device 1200 is held by a holding jig 1400*a*. The configuration material discharge unit 1230 includes a discharge nozzle 1230*a* and a discharge driving unit 1230*b* that discharges the configuration material from the discharge nozzle 1230*a* by a material supply controller 1500.

FIG. 4 is an enlarged schematic view of a portion C' showing the head base 1600 shown in FIG. 3. As shown in FIG. 4, the plurality of head units 1900 are held in the head base 1600. Each of the head units 1900 is configured such that a support material discharge unit 1730 included in a support material supply device 1700 is held by a holding jig 1900*a*. The support material discharge unit 1730 includes a discharge nozzle 1730*a* and a discharge driving unit 1730*b* that discharges the support material from the discharge nozzle 1730*a* by the material supply controller 1500.

As shown in FIGS. 1 and 2, each of the configuration material discharge units 1230 is coupled to, by a supply tube 1220, a configuration material supply unit 1210 which accommodates the configuration material corresponding to each of the head units 1400 held in the head base 1100. Then, a predetermined configuration material is supplied from the configuration material supply unit 1210 to one of the configuration material discharge units 1230. In the configuration material supply unit 1210, the configuration materials of the three-dimensional shaped object shaped by the manufacturing apparatus 2000 for three-dimensional shaped object according to the present embodiment are accommodated in configuration material accommodation units 1210*a*, and each of the configuration material accommodation units 1210*a* is coupled to each of the configuration material discharge units 1230 by the supply tube 1220. In this way, the configuration material supply unit 1210 can supply a plurality of different types of materials from the head base 1100 by including the configuration material accommodation units 1210*a*.

As shown in FIGS. 3 and 4, each of the support material discharge units 1730 is coupled to, by a supply tube 1720, a support material supply unit 1710 which accommodates the support material corresponding to each of the head units 1900 held in the head base 1600. Then, a predetermined support material is supplied from the support material supply unit 1710 to one of the support material discharge units 1730. In the support material supply unit 1710, the support materials constituting the support layer 300 when the three-dimensional shaped object is shaped are accommodated in support material accommodation units 1710*a*, and each of the support material accommodation units 1710*a* is coupled to each of the support material discharge units 1730 by the supply tube 1720. In this way, the support material supply unit 1710 can supply a plurality of different types of support materials from the head base 1600 by including the support material accommodation units 1710*a*.

The manufacturing apparatus 2000 for three-dimensional shaped object includes a control unit 400 as a control means that controls the above-described stage 120, the configuration material discharge units 1230 included in the configuration material supply device 1200, and the support material discharge units 1730 included in the support material supply device 1700 based on shaping data of a three-dimensional shaped object output from a data output device which is not shown, such as a personal computer. Then, the control unit 400 includes a controller, which is not shown, that performs control such that the stage 120 and the configuration material discharge units 1230 are driven and operated in cooperation, and that performs control such that the stage 120 and the support material discharge units 1730 are driven and operated in cooperation.

In the stage 120 movably included in the base 110, in a stage controller 410, a signal that controls start and stop of movement, a moving direction, a moving amount, a moving speed, and the like of the stage 120 is generated based on a control signal from the control unit 400, the signal is sent to the driving device 111 included in the base 110, and the stage 120 moves in the X, Y, and Z directions shown in drawing. In the configuration material discharge units 1230 included in the head units 1400, in the material supply controller 1500, a signal that controls a material discharge amount from the discharge nozzles 1230*a* in the discharge driving units 1230*b* included in the configuration material discharge units 1230 is generated based on the control signal from the control unit 400, and a predetermined amount of the configuration material is discharged from the discharge nozzle 1230*a* upon the generated signal.

Similarly, in the support material discharge units 1730 included in the head units 1900, in the material supply controller 1500, a signal that controls material discharge amounts from the discharge nozzles 1730*a* in the discharge driving units 1730*b* included in the support material discharge units 1730 is generated based on the control signal from the control unit 400, and predetermined amounts of the support materials are discharged from the discharge nozzles 1730*a* upon the generated signal. Further, the electromagnetic wave irradiation unit 1000 also irradiates the layers 501, 502, 503, . . . 50*n* of the three-dimensional shaped object formed on the stage 120 or the sample plate 121 with an electromagnetic wave under the control of the control unit 400.

Figure 6:
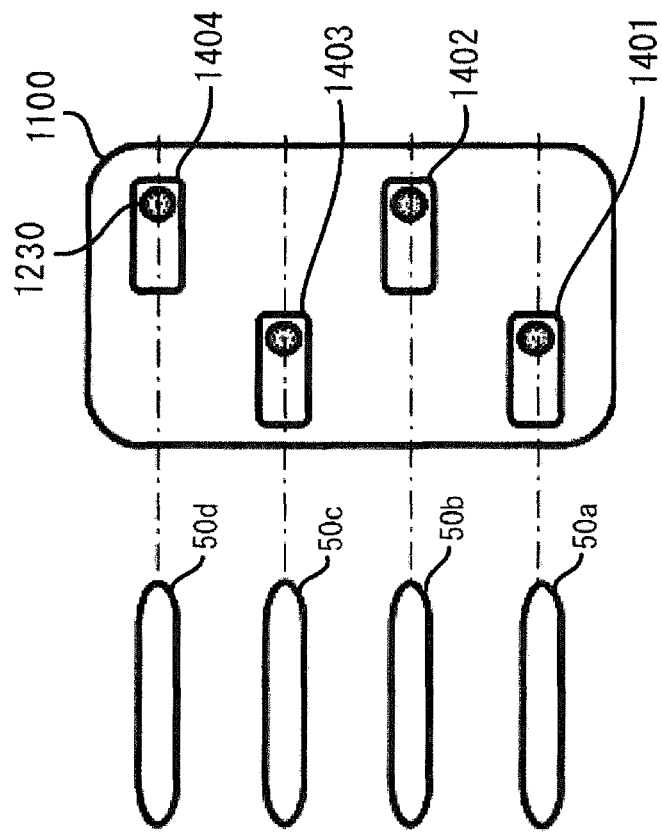
FIG. 6 is a plan view conceptually showing a relationship between an arrangement of head units and a formation form of a three-dimensional shaped object according to the embodiment of the present application.
Figure 7:
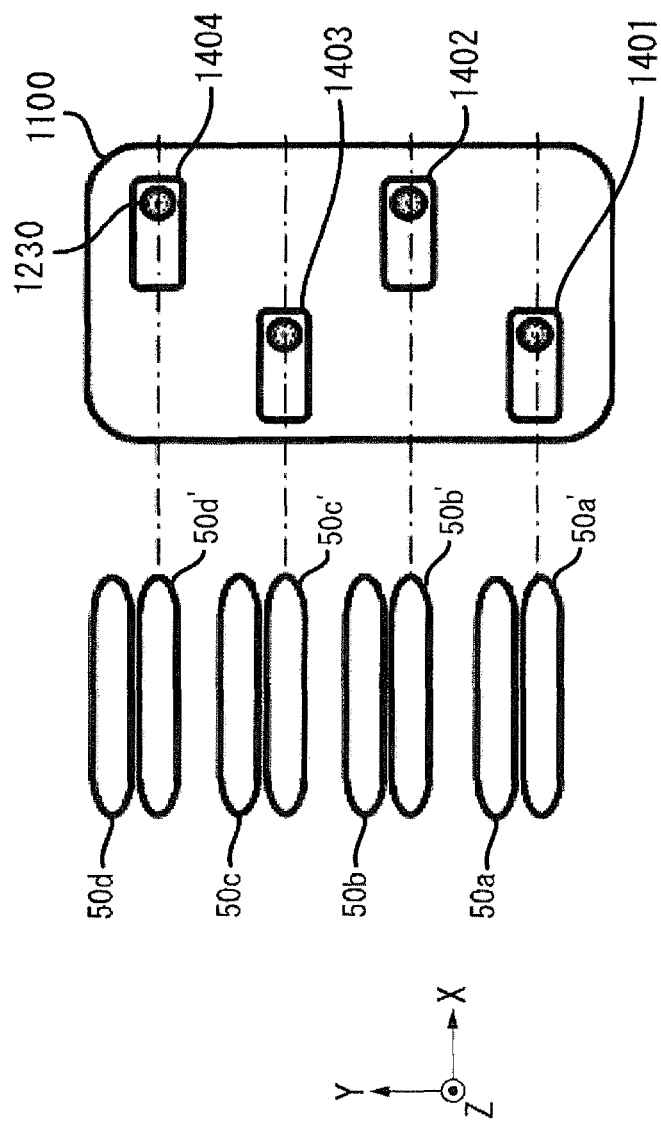
FIG. 7 is a plan view conceptually showing a relationship between the arrangement of the head units and the formation form of the three-dimensional shaped object according to the embodiment of the present application.
Figure 8:
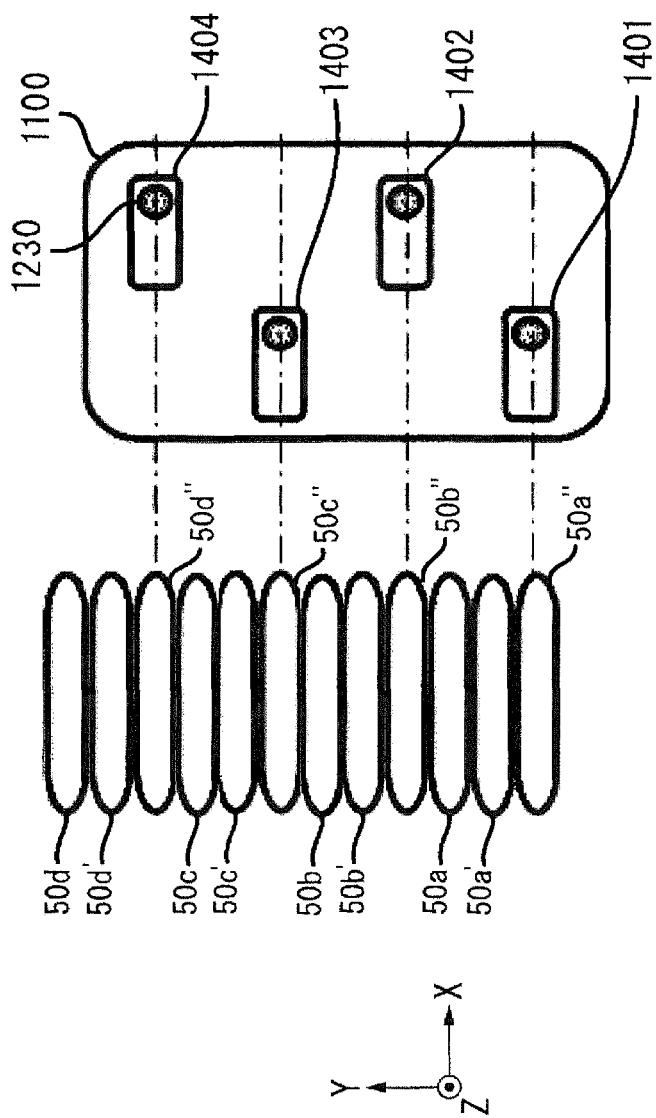
FIG. 8 is a plan view conceptually showing the relationship between an arrangement of the head units and the formation form of the three-dimensional shaped object according to the embodiment of the present application.

Next, the head units 1400 will be described in more detail. The head units 1900 have a similar configuration as the head units 1400. Therefore, a detailed description of the configuration of the head units 1900 will be omitted. FIG. 5, and FIGS. 6 to 8 show an example of a holding form of the plurality of head units 1400 and configuration material discharge units 1230 held in the head base 1100, and FIGS. 6 to 8 are external views of the head base 1100 from a direction of an arrow D shown in FIG. 2.

Figure 5:
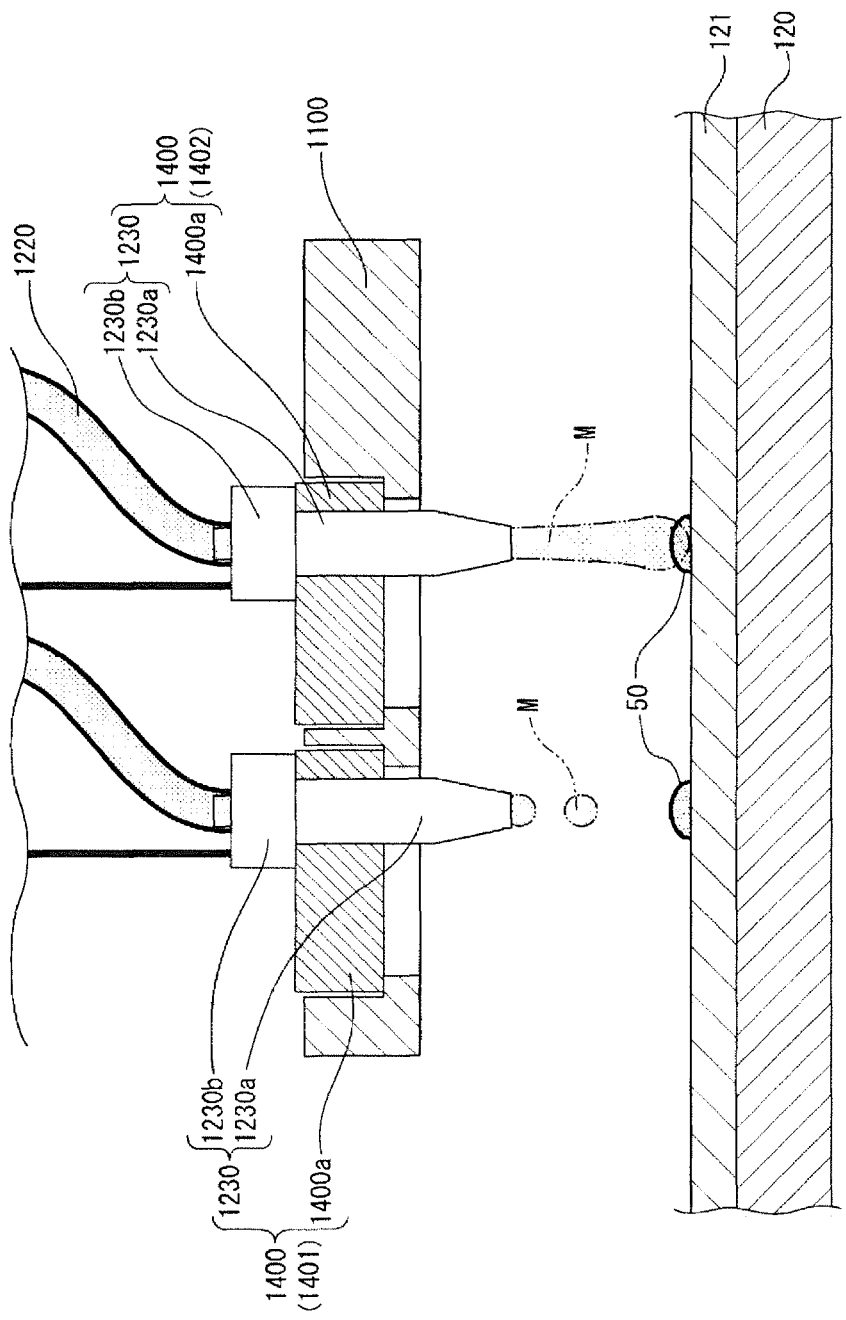
FIG. 5 is a schematic cross-sectional view of a head base according to the embodiment of the present application.

As shown in FIG. 5, the plurality of head units 1400 are held in the head base 1100 by a fixing means which is not shown. Further, as shown in FIGS. 6 to 8, the head base 1100 of the manufacturing apparatus 2000 for three-dimensional shaped object according to the present embodiment includes the head units 1400 including four units, that are a head unit 1401 of a first column, a head unit 1402 of a second column, a head unit 1403 of a third column, and a head unit 1404 of a fourth column from below in the drawing, which are alternately arranged. Further, as shown in FIG. 6, the configuration materials are discharged from the head units 1400 while the stage 120 is moved in the X direction with respect to the head base 1100, so as to form structure layer constituting parts 50, specifically, structure layer constituting parts 50a, 50b, 50c, and 50d. A procedure of forming the structure layer constituting parts 50 will be described later. Although not shown, the configuration material discharge unit 1230 included in each of the head units 1401 to 1404 is connected to the configuration material supply unit 1210 by the supply tube 1220 via the discharge driving unit 1230b.

As shown in FIG. 5, the configuration material discharge units 1230 discharge a material M, which is the configuration material of the three-dimensional shaped object, from the discharge nozzles 1230a onto the sample plate 121 placed on the stage 120. In the head unit 1401, a discharge form in which the material M is discharged in a droplet form is shown, and in the head unit 1402, a discharge form in which the material M is supplied in a continuous form is shown. The discharge form of the material M may be the droplet form or the continuous form (the discharge nozzle 1230a and the stage 120 are maintained at a desired distance and the material M is discharged in contact with the stage 120 or the layers 500), whereas in the present embodiment, the material M will be described in a form of being discharged in the droplet form. Regarding the support material discharge units 1730, a discharge form of the support material may be the droplet form or the continuous form, and the support material may be discharged in a paste form or discharged by melting the resin.

The material M discharged in the droplet form from the discharge nozzles 1230a flies substantially in a gravity direction and lands on the sample plate 121. The stage 120 is moved, and the structure layer constituting parts 50 are formed by the landed material M. As shown in FIG. 1 and the like, an assembly of the structure layer constituting part 50 is formed as the structure layer 310 of the three-dimensional shaped object formed on the sample plate 121.

Figure 9:
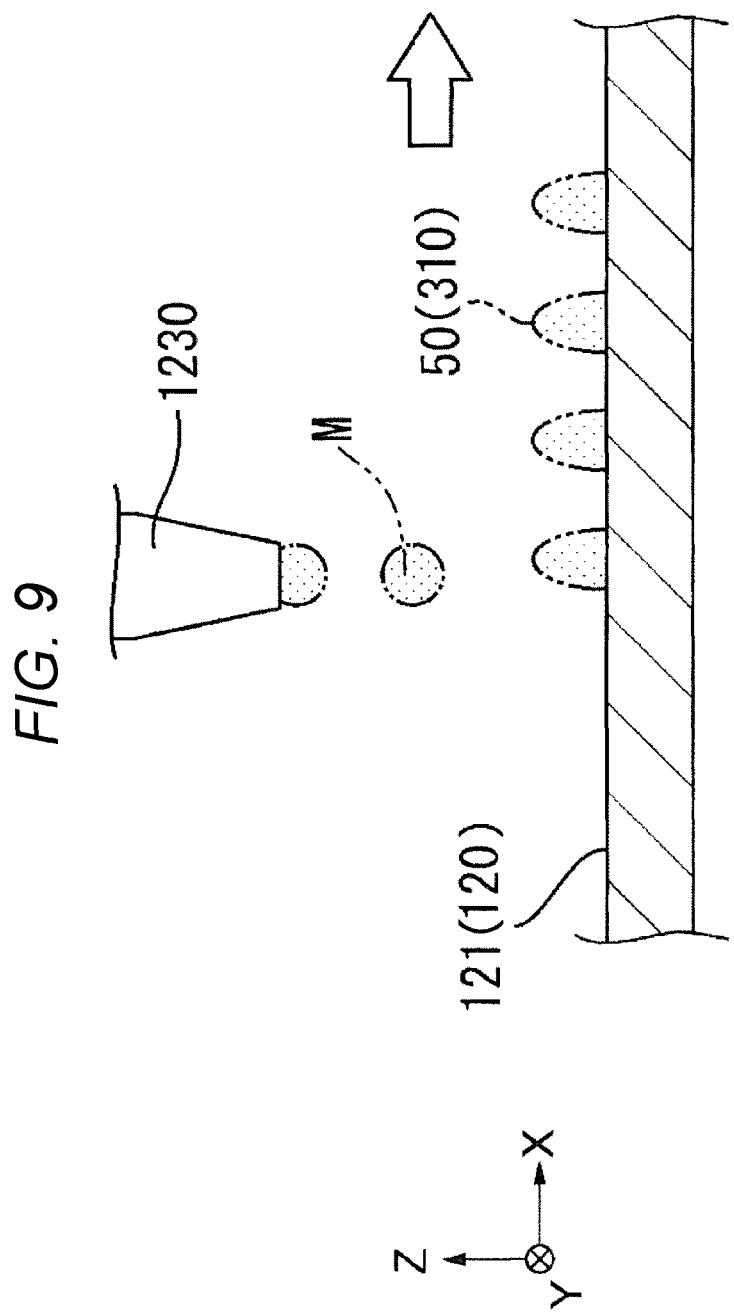
FIG. 9 is a schematic view conceptually showing a formation form of the three-dimensional shaped object.
Figure 10:
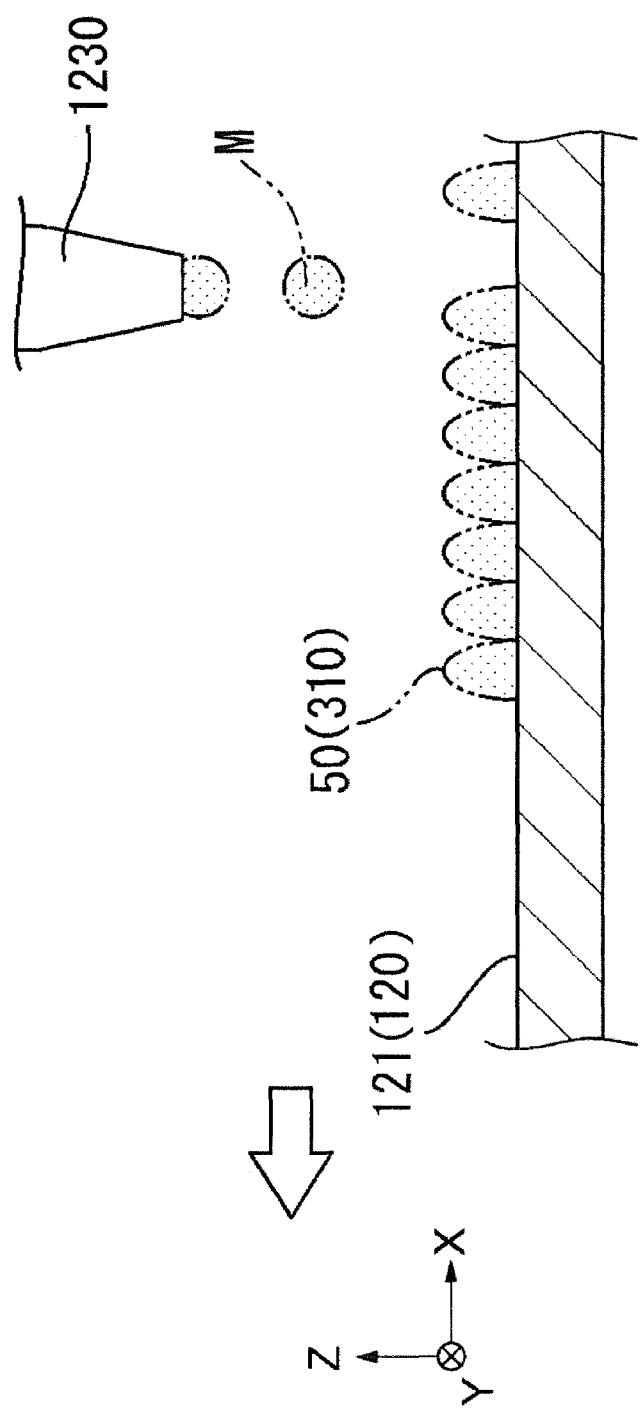
FIG. 10 is a schematic view conceptually showing the formation form of the three-dimensional shaped object.

Next, the procedure of forming the structure layer constituting parts 50 will be described using FIGS. 6 to 8 and FIGS. 9 and 10. FIGS. 6 to 8 are plan views conceptually showing a relationship between an arrangement of the head units 1400 and a formation form of the structure layer constituting parts 50 of the present embodiment. FIGS. 9 and 10 are side views conceptually showing the formation form of the structure layer constituting parts 50.

First, when the stage 120 moves in a +X direction, the material M is discharged in the droplet form from the plurality of discharge nozzles 1230a, the material M is arranged to a predetermined position of the sample plate 121, so as to form the structure layer constituting parts 50. More specifically, first, as shown in FIG. 9, while the stage 120 is moved in the +X direction, the material M is arranged at a predetermined interval from the plurality of discharge nozzles 1230a to the predetermined position of the sample plate 121.

Next, as shown in FIG. 10, while the stage 120 is moved in a −X direction, the material M is newly arranged so as to fill a space between the materials M arranged at the predetermined interval. However, while the stage 120 is moved in the +X direction, the material M may be arranged such that the material M overlaps with each other at the predetermined position of the sample plate 121 from the plurality of discharge nozzles 1230a, that is, the material M is arranged without any interval. In other words, the structure layer constituting parts 50 may be formed only by one-side movement of the stage 120 in the X direction, instead of forming the structure layer constituting parts 50 by reciprocating movement of the stage 120 in the X direction.

By forming the structure layer constituting parts 50 as described above, the structure layer constituting parts 50, specifically, the structure layer constituting parts 50a, 50b, 50c, and 50d as shown in FIG. 6 of a first line in the X direction and a first line in the Y direction of each of the head units 1401, 1402, 1403, and 1404 are formed.

Next, in order to form structure layer constituting parts 50', specifically, structure layer constituting parts 50a', 50b', 50c', and 50d' of a second line in the Y direction of each of the head units 1401, 1402, 1403, and 1404, the head base 1100 is moved to a −Y direction. As the moving amount, the head base 1100 is moved in the −Y direction by a pitch of P/n, where P is a pitch between the nozzles, and n is a natural number. In the present embodiment, description will be made with n being 3. As shown in FIGS. 9 and 10, by performing the similar operation as described above, the structure layer constituting parts 50', specifically, the structure layer constituting parts 50a', 50b', 50c', and 50d' of the second line in the Y direction as shown in FIG. 7 are formed.

Next, in order to form structure layer constituting parts 50", specifically, structure layer constituting parts 50a", 50b", 50c", and 50d" of a third line in the Y direction of each of the head units 1401, 1402, 1403, and 1404, the head base 1100 is moved to the −Y direction. The head base 1100 is moved in the −Y direction by the pitch of P/3 as the moving amount. Then, as shown in FIGS. 9 and 10, by performing the similar operation as described above, the structure layer constituting parts 50", specifically, structure layer constituting parts 50a", 50b", 50c", and 50d" of the third line in the Y direction as shown in FIG. 8 are formed, and the structure layer 310 can be obtained.

Further, regarding the material M discharged from the configuration material discharge units 1230, any unit or two or more units of the head units 1401, 1402, 1403, and 1404 may discharge and supply a configuration material different from that of the other head units. Therefore, a three-dimensional shaped object formed from different types of materials can be obtained by using the manufacturing apparatus 2000 for three-dimensional shaped object according to the present embodiment.

In the first layer 501, before or after the structure layer 310 is formed as described above, the support material is discharged from the support material discharge units 1730 and the support layer 300 can be formed by the similar method. Similarly, when the layers 502, 503, ..., 50n are formed by stacking on the layer 501, the structure layer 310 and the support layer 300 can be formed.

Numbers and arrangement of the head units 1400 and 1900 included in the manufacturing apparatus 2000 for three-dimensional shaped object according to the present embodiment described above are not limited to the numbers and arrangement described above. As an example, FIGS. 11 and 12 schematically show other examples of the arrangement of the head unit 1400 arranged in the head base 1100.

Figure 11:
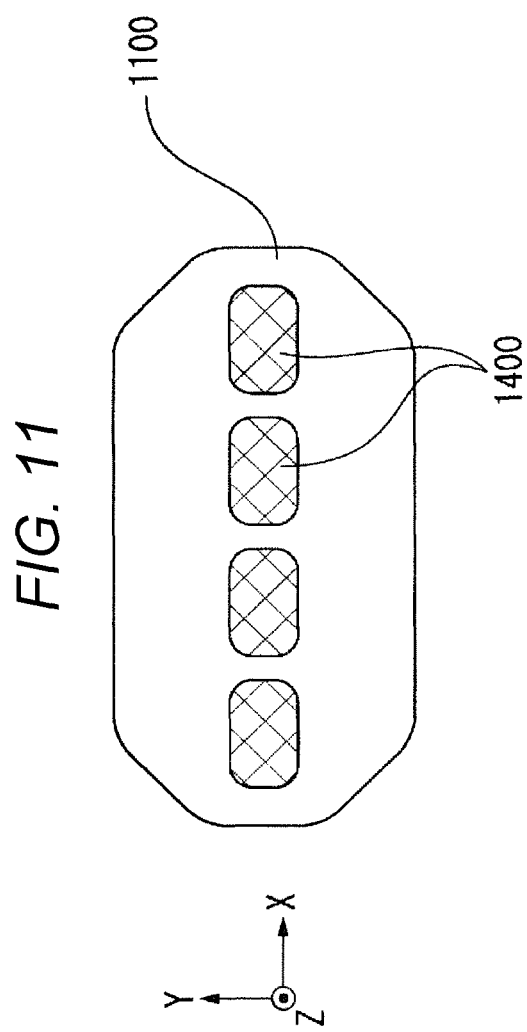
FIG. 11 is a schematic view showing an example of another arrangement of a head unit arranged on the head base.
Figure 12:
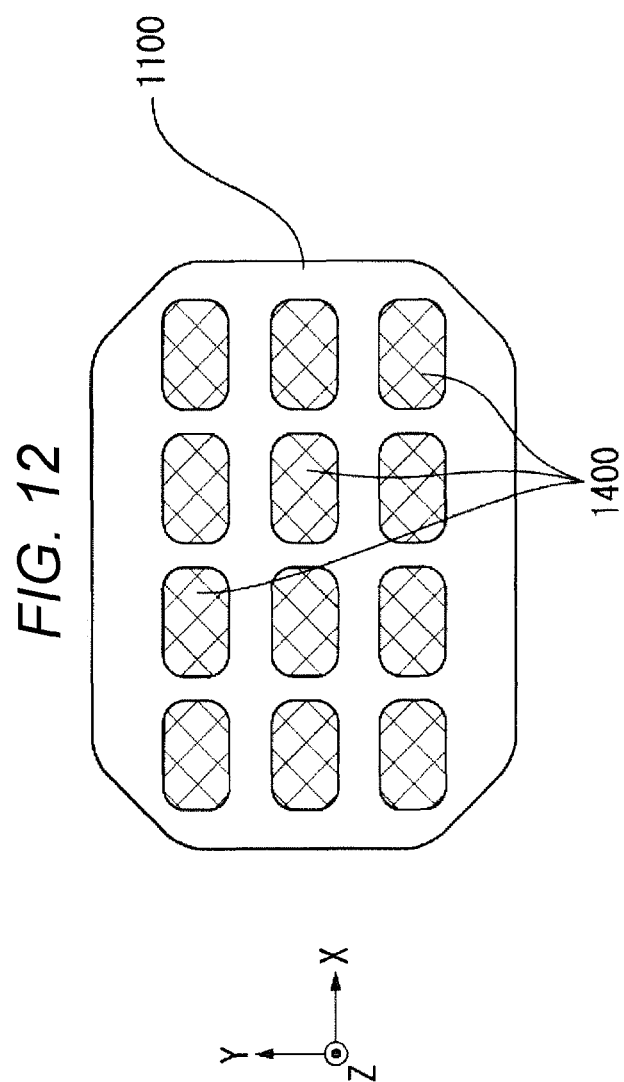
FIG. 12 is a schematic view showing an example of another arrangement of the head unit arranged on the head base.

FIG. 11 shows a configuration in which a plurality of head units 1400 are arranged in parallel in the X-axis direction in the head base 1100. FIG. 12 shows a configuration in which head units 1400 are arranged in a lattice shape in the head base 1100. The number of head units to be arranged is not limited to the shown examples.

Next, an embodiment of the method for manufacturing a three-dimensional shaped object performed by using the above-described manufacturing apparatus 2000 for three-dimensional shaped object will be described with reference to the flowcharts of FIGS. 13 and 14.

First, the embodiment of the method for manufacturing a three-dimensional shaped object shown by the flowchart of FIG. 13 will be described. In the method for manufacturing a three-dimensional shaped object shown by the flowchart of FIG. 13, first, in a shaping data input step of step S110, the shaping data of the three-dimensional shaped object to be manufactured is input. An input source of the shaping data of the three-dimensional shaped object is not particularly limited, whereas the shaping data can be input to the manufacturing apparatus 2000 for three-dimensional shaped object using an external device or the like.

Next, in a support layer formation determination step of step S120, the control unit 400 of the manufacturing apparatus 2000 for three-dimensional shaped object determines whether the support layer 300 is to be formed in one of the layers 500 when the layer 500 is to be formed based on the shaping data. Then, when it is determined that the support layer 300 is to be formed, the process proceeds to the support shaping step of step S130, and when it is determined that the support layer 300 is not to be formed, the process proceeds to the structure shaping step of step S140.

In the support shaping step of step S130, as described above, the support layer 300 is formed as a support T that supports a structure S of the three-dimensional shaped object by the support material including the resin. Then, in the structure shaping step of step S140, as described above, the structure layer 310 is formed as the structure S by the shaping material including the metal powder or the ceramic powder. When it is determined that the support layer 300 is to be formed in the support layer formation determination step of step S120, the support layer 300 is shaped before the structure layer 310 is shaped in the present embodiment, whereas the support layer 300 may be shaped after the structure layer 310 is shaped.

Then, in a shaping data completion determination step of step S200, the control unit 400 of the manufacturing apparatus 2000 for three-dimensional shaped object determines whether the formation of all the layers 500 based on the shaping data input in step S110 is completed. When it is determined that the formation of all the layers 500 is not completed, the process returns to the support layer formation determination step of step S120 to form a next layer 500. On the other hand, when it is determined that the formation of all the layers 500 is completed, the process proceeds to the deresining step of step S210.

Figure 15:
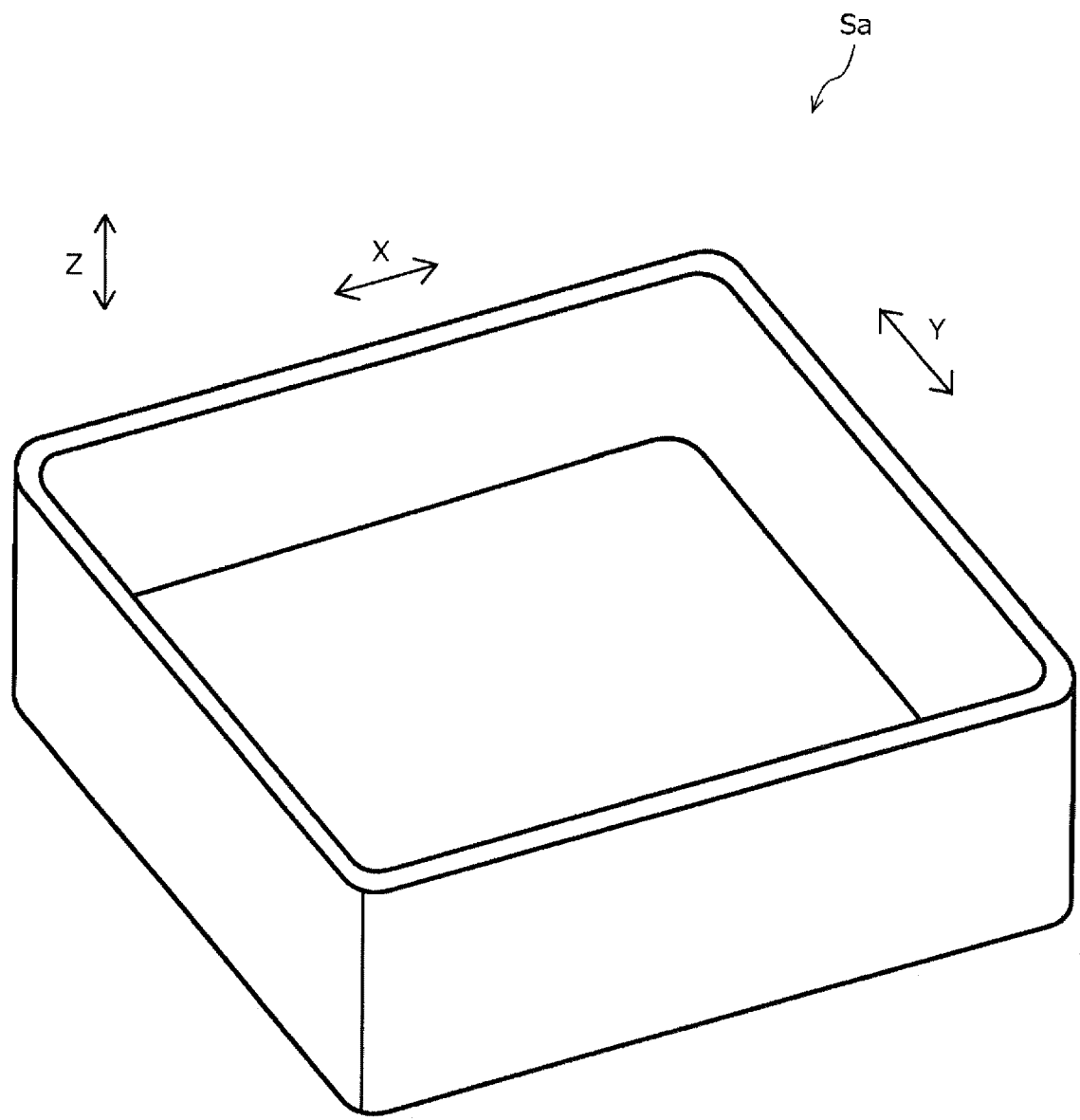
FIG. 15 is a schematic perspective view showing a housing portion of an example of a structure shaped by the method of manufacturing the three-dimensional shaped object according to the embodiment of the present application.
Figure 16:
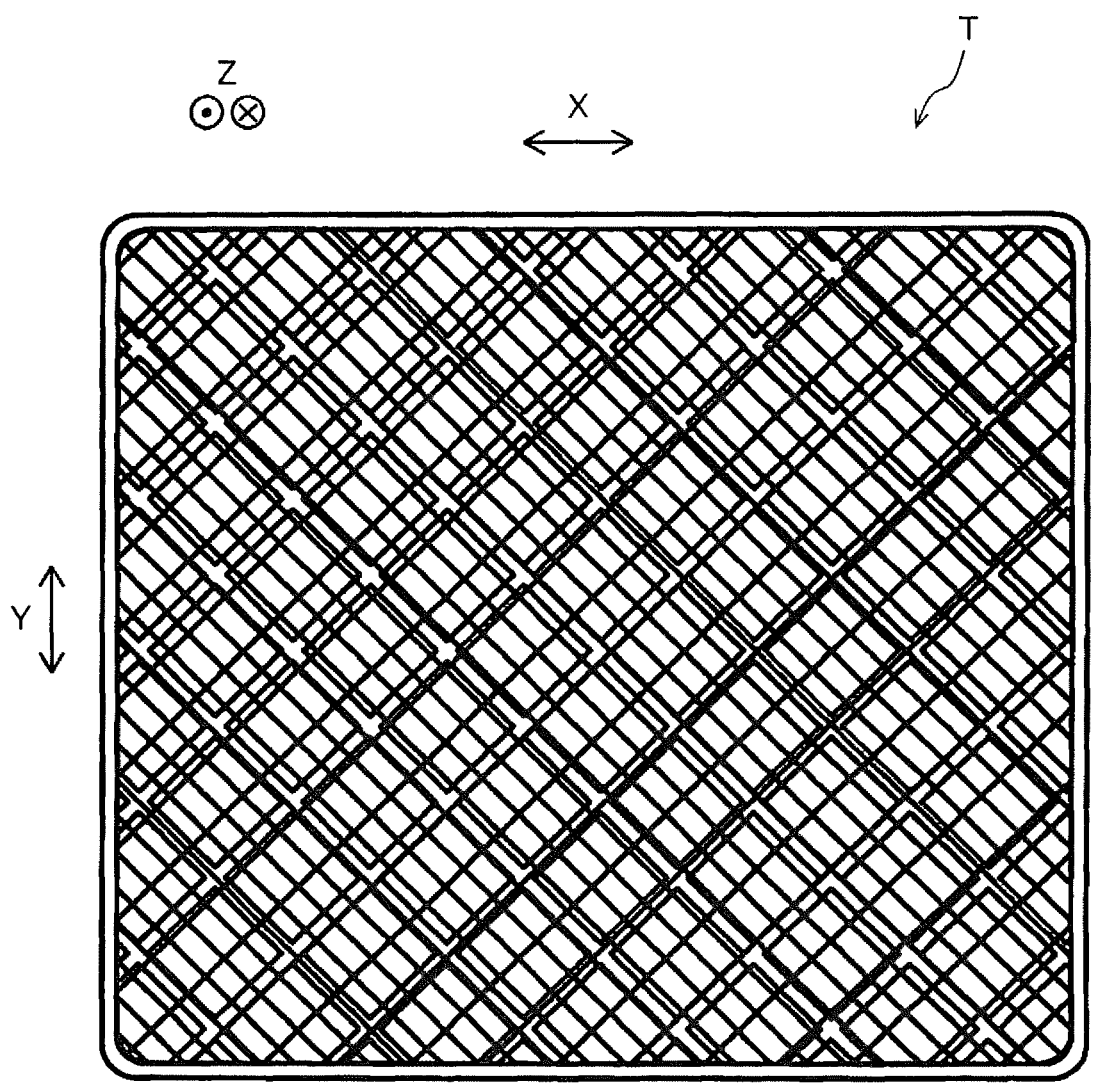
FIG. 16 is a schematic plan view showing an example of a support shaped by the method of manufacturing the three-dimensional shaped object according to the embodiment of the present application.
Figure 17:
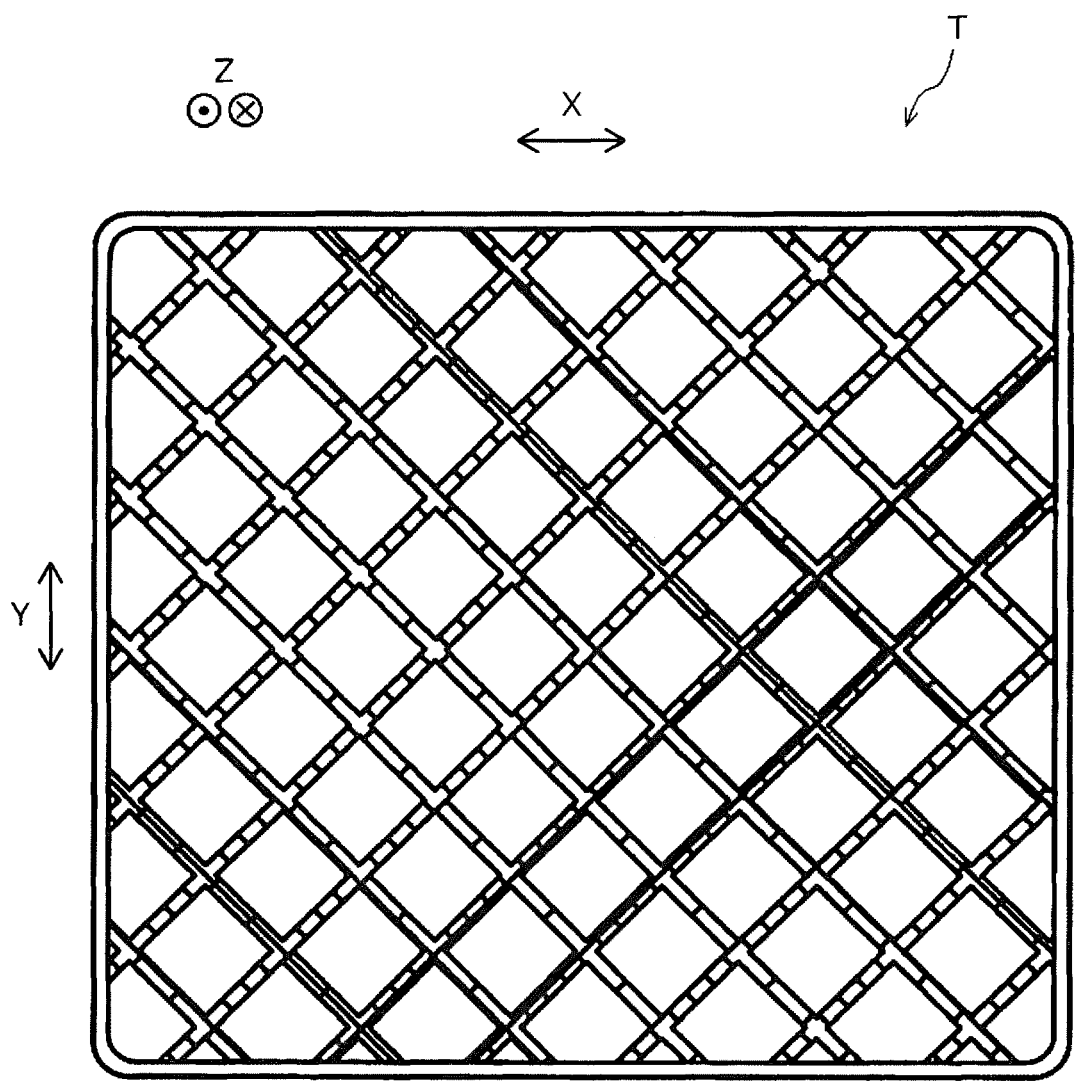
FIG. 17 is a schematic bottom view showing an example of a support shaped by the method of manufacturing the three-dimensional shaped object according to the embodiment of the present disclosure.
Figure 18:
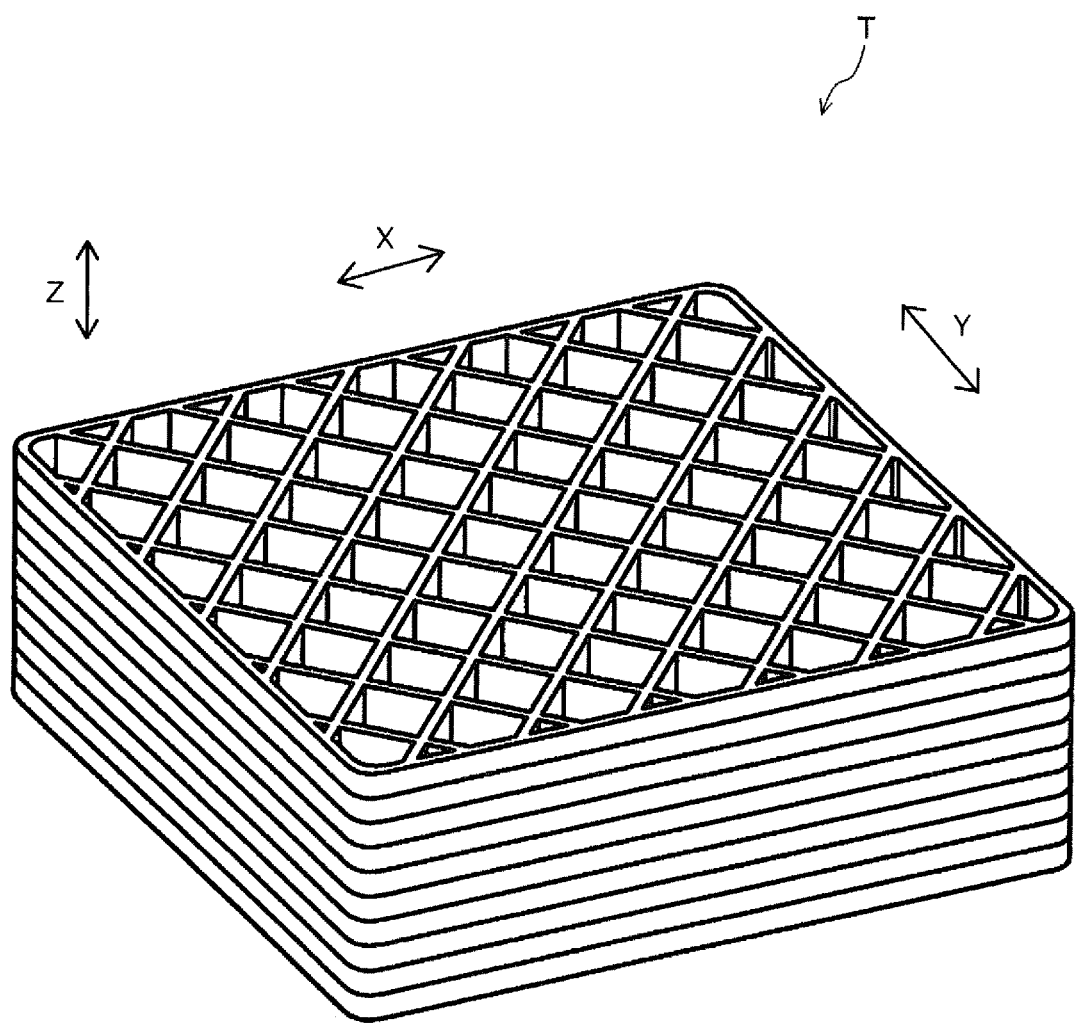
FIG. 18 is a schematic perspective view from a bottom side showing an example of the support shaped by the method of manufacturing the three-dimensional shaped object according to the embodiment of the present disclosure.
Figure 19:
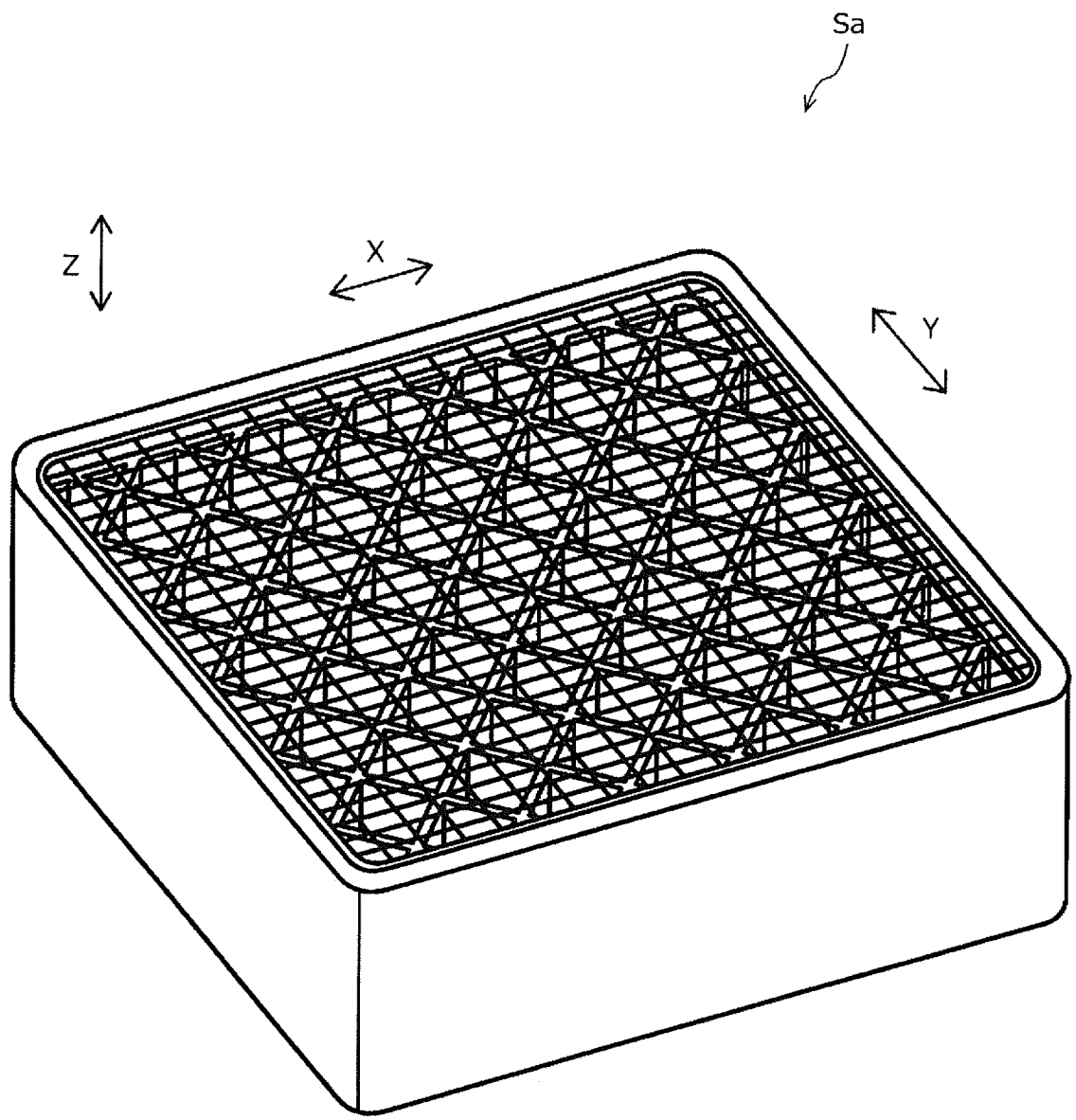
FIG. 19 is a schematic perspective view showing a state where the housing portion in the structure shown in FIG. 15 and the support shown in FIGS. 16 to 18 are integrally shaped.
Figure 20:
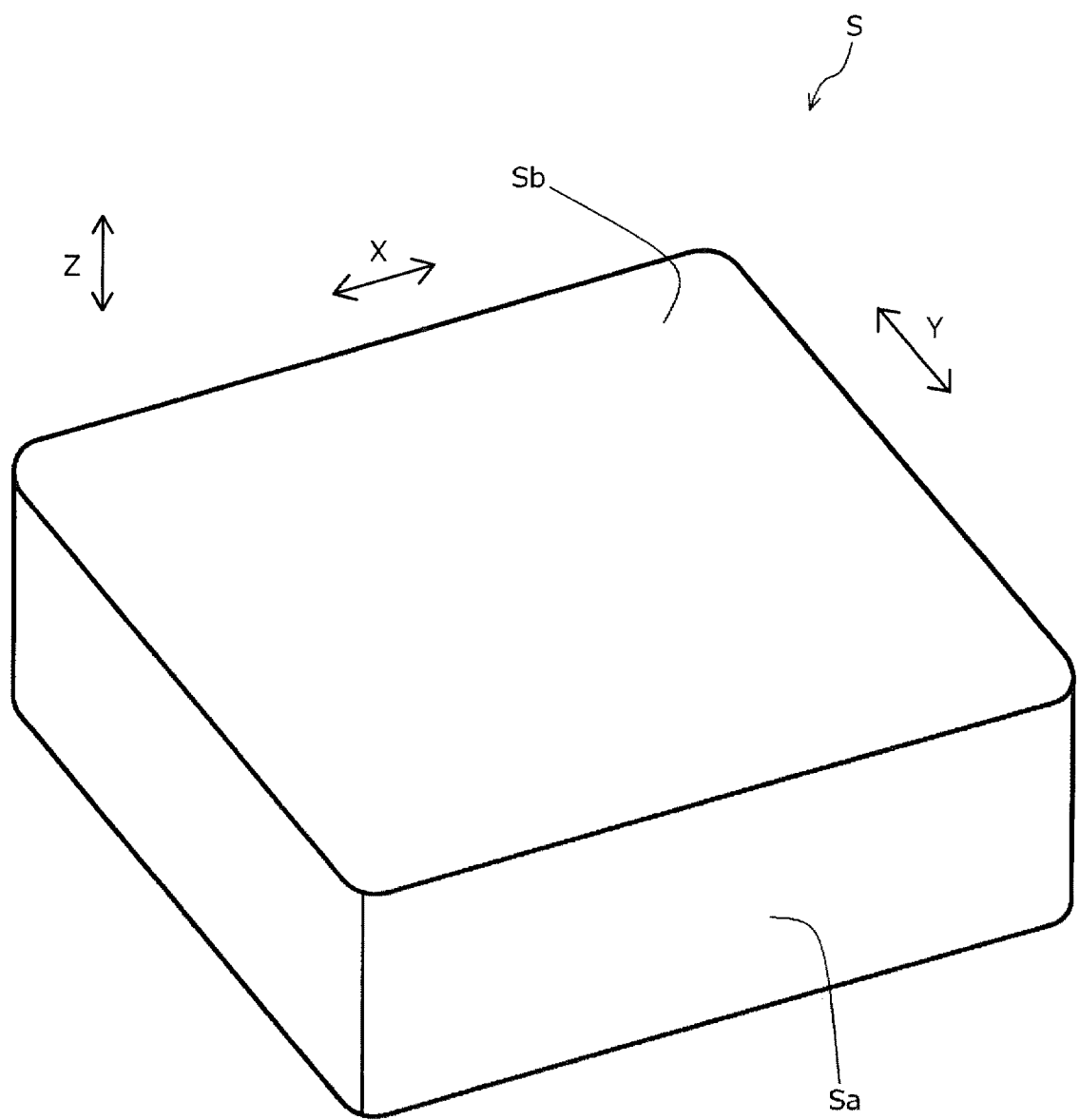
FIG. 20 is a schematic perspective view showing a state where a cover portion is further formed on the structure in which the support shown in FIG. 19 is accommodated in the housing portion.

Herein, FIG. 19 shows an example of the structure S in the middle of being manufactured by repeating the steps from the support layer formation determination step of step S120 to the shaping data completion determination step of step S200. Specifically, FIG. 19 shows a state where a housing portion Sa of the structure S and the support T accommodated in the housing portion Sa are shaped. FIGS. 15 to 20 are conceptual schematic views. The housing portion Sa of the structure S shown in FIG. 15 is a rectangular parallelepiped whose upper surface is open. The support T shown in FIGS. 16 to 18 is a rectangular parallelepiped that can be accommodated in the housing portion Sa shown in FIG. 15 and has a dense mesh shape on an upper surface side and a rough mesh shape on a lower surface (bottom surface) side. FIG. 19 shows a state in which the support T shown in FIGS. 16 to 18 is accommodated in the housing portion Sa shown in FIG. 15. Then, FIG. 20 shows a state where a cover portion Sb is formed on the upper surface side of the housing portion Sa in which the support T shown in FIG. 19 is accommodated.

In the method for manufacturing a three-dimensional shaped object according to the present embodiment, specifically, first, the housing portion Sa as shown in FIG. 15 is formed as the structure S, and the support T is integrally formed with the housing portion Sa at the same time as the housing portion Sa such that the support T having a shape shown in FIGS. 16 to 18 is accommodated in the housing portion Sa. Then, as shown in FIG. 19, after the support T is accommodated in the housing portion Sa, the cover portion Sb is shaped as shown in FIG. 20. Since the cover portion Sb is formed being supported by the support T, not only the housing portion Sa, deformation of the cover portion Sb is prevented. As can be seen by comparing FIGS. 16 and 17, the upper surface of the support T in contact with the cover portion Sb is formed more densely than the lower surface which is not in contact with the cover portion Sb.

In the deresining step of step S210, the structure S and a resin composition of the support T, which are manufactured by repeating the steps from the support layer formation determination step of step S120 to the shaping data completion determination step of step S200, are deresined by being heated and volatilized using the electromagnetic wave irradiation unit 1000 of the manufacturing apparatus 2000 for three-dimensional shaped object.

Then, in the sintering step of step S220, the structure S deresined in the deresining step of step S210 is heated to sinter the shaping material. Even when the structure S and the resin composition of the support T remains even after the deresining step of step S210 is performed, the resin component is removed in accordance with the execution of the sintering step of step S220. Herein, the sintering step of the present step S220 may be performed using a device different from the manufacturing apparatus 2000 for three-dimensional shaped object, or may be performed in the manufacturing apparatus 2000 for three-dimensional shaped object by providing a thermostatic oven capable of setting a high temperature in the manufacturing apparatus 2000 for three-dimensional shaped object. Then, with completion of the sintering step of step S220, the method for manufacturing a three-dimensional shaped object of the present embodiment is ended.

Figure 13:
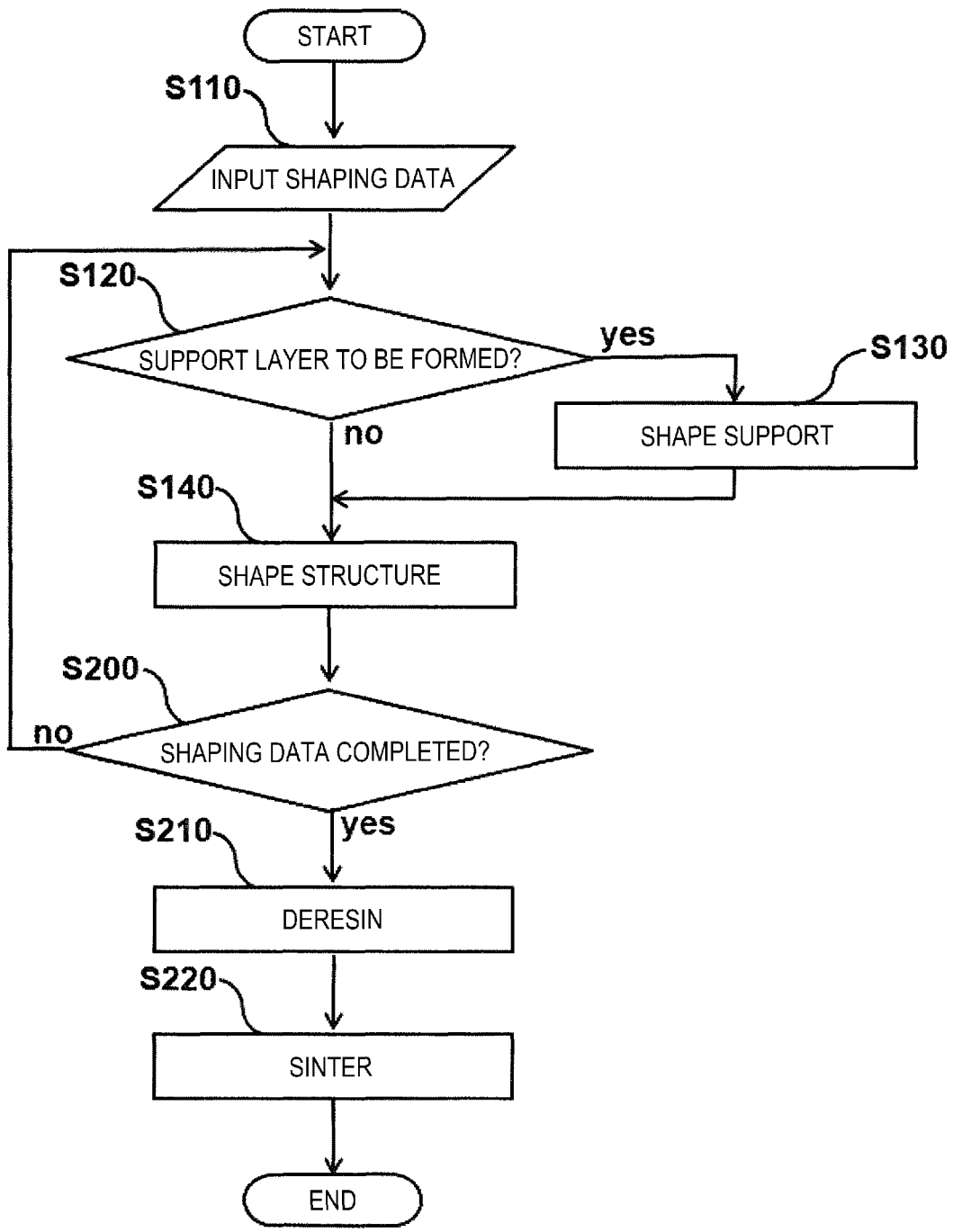
FIG. 13 is a flowchart of the method for manufacturing a three-dimensional shaped object according to the embodiment of the present application.

As described above, in the embodiment of the method for manufacturing a three-dimensional shaped object shown by the flowchart of FIG. 13, the housing portion Sa of the structure S and the support T are integrally shaped at the same time. On the other hand, in the embodiment of the method for manufacturing a three-dimensional shaped object shown by the flowchart of FIG. 14, the housing portion Sa of the structure S and the support T are formed at different positions, and then the support T is accommodated in the housing portion Sa.

Next, the embodiment of the method for manufacturing a three-dimensional shaped object shown by the flowchart of FIG. 14 will be described. Since the steps of the same step number in the flowchart of FIG. 13 and the flowchart of FIG.

14 are the same steps, description of steps of the step number described in the method for manufacturing a three-dimensional shaped object shown by the flowchart of FIG. 13 will be omitted.

Figure 14:
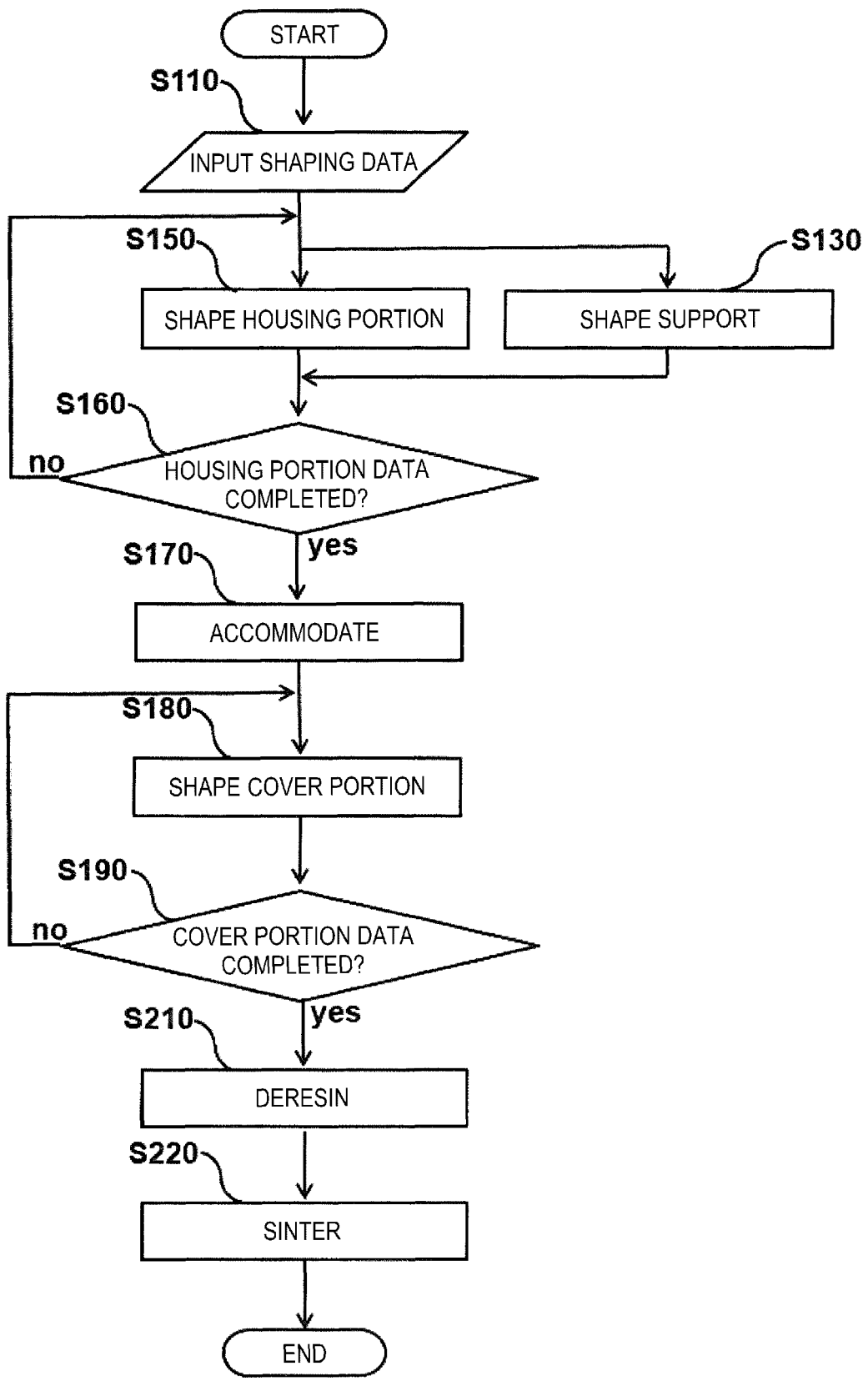
FIG. 14 is a flowchart of a method for manufacturing a three-dimensional shaped object according to the embodiment of the present application, which is different from the flowchart of FIG. 13.

In the method for manufacturing a three-dimensional shaped object shown by the flowchart of FIG. 14, when the shaping data is input in the shaping data input step of step S110, bases on the shaping data, the support T is shaped in the support shaping step of step S130, and the housing portion Sa of the structure S is shaped in a housing portion shaping step of step S150 at a position different from the shaping position of the support T in the sample plate 121 or the stage 120. Herein, the support T shaped in the support shaping step of step S130 corresponds to, for example, the support T shown in FIGS. 16 to 18, and the housing portion Sa shaped in the housing portion shaping step of step S150 corresponds to, for example, the housing portion Sa shown in FIG. 15.

Then, in a housing portion data completion determination step of step S160, in the control unit 400 of the manufacturing apparatus 2000 for three-dimensional shaped object, it is determined whether the formation of all the layers 500 based on housing portion data corresponding to the housing portion Sa and support data corresponding to the support T among the shaping data input in step S110 is completed. When it is determined that the formation of all the layers 500 is not completed, the process returns to the support shaping step of step S130 and the housing portion shaping step of step S150 to form a next layer 500. On the other hand, when it is determined that the formation of all the layers 500 is completed, the process proceeds to the accommodating step of step S170.

In the accommodating step of step S170, the support T is accommodated in the housing portion Sa. In the accommodating step of present step S170, an operator may manually accommodate the support T in the housing portion Sa, or an automatic housing mechanism that automatically accommodates the support T in the housing portion Sa may be provided in the manufacturing apparatus 2000 for three-dimensional shaped object and the support T may be accommodated in the housing portion Sa by the automatic housing mechanism. When the support T shown in FIGS. 16 to 18 is accommodated in the housing portion Sa shown in FIG. 15, by setting the surface having a high density of a resin line segment in the support T shown in FIG. 16 as the upper surface, the layers 500 of the cover portion Sb to be described later can be effectively supported when the layers 500 is formed.

Next, in a cover portion shaping step of step S180, the layers 500 of the cover portion Sb are shaped in the housing portion Sa in which the support T is accommodated in the accommodating step of step S170.

Then, in a cover portion data completion determination step of step S190, in the control unit 400 of the manufacturing apparatus 2000 for three-dimensional shaped object, it is determined whether the formation of all the layers 500 based on cover portion data corresponding to the cover portion Sb among the shaping data input in step S110 is completed. When it is determined that the formation of all the layers 500 is not completed, the process returns to the cover portion shaping step of step S180 to form a next layer 500. On the other hand, when it is determined that the formation of all the layers 500 is completed, the process proceeds to the deresining step of step S210.

In the method for manufacturing a three-dimensional shaped object shown by the flowchart of FIG. 14, the housing portion shaping step of step S150 and the cover portion shaping step of step S180 correspond to the structure shaping step of step S140 in the method for manufacturing a three-dimensional shaped object shown by the flowchart of FIG. 13.

As described above, the method for manufacturing a three-dimensional shaped object shown by the flowchart of FIGS. 13 and 14 includes the structure shaping step of step S140 of shaping the structure S with the shaping material including the metal powder or the ceramic powder, the support shaping step of step S130 of shaping the support T that supports the structure S with the support material including the resin, and the deresining step of step S210 of deresining the support T supporting the structure S.

That is, in the method for manufacturing a three-dimensional shaped object shown by the flowchart of FIGS. 13 and 14, the support T is shaped by the support material including the resin, and the support T supporting the structure S is deresined. Therefore, by performing the method for manufacturing a three-dimensional shaped object shown by the flowchart of FIGS. 13 and 14, by deresining the support T, even if the shape of the structure S is complicated, the possibility that the support T cannot be removed can be reduced.

Further, in the method for manufacturing a three-dimensional shaped object shown by the flowchart of FIGS. 13 and 14, the housing portion Sa is shaped in the structure shaping step of step S140, and the cover portion Sb is shaped in the state where the support T is accommodated in the housing portion Sa. Therefore, by performing the method for manufacturing a three-dimensional shaped object shown by the flowchart of FIGS. 13 and 14, the cover portion Sb can be supported by the support T, and the deformation of the three-dimensional shaped object can be prevented. The structure S shown in FIG. 20 has a shape in which the housing portion Sa is substantially sealed by the cover portion Sb, whereas a structure S having a configuration that a part of the housing portion Sa is covered by the cover portion Sb may be shaped. Further, even the structure S having the shape where the housing portion Sa is substantially sealed by the cover portion Sb is to be deresined, the resin of the support T can be removed from a gap between the metal powder or the ceramic powder constituting the structure S which is a green body before deresining.

As described above, in the method for manufacturing a three-dimensional shaped object shown by the flowchart of FIG. 13, the housing portion Sa and the support T are integrally shaped at the same time. In other words, in the method for manufacturing a three-dimensional shaped object shown by the flowchart of FIG. 13, the support T is shaped such that the support T is accommodated in the housing portion Sa via the support shaping step of step S130 while the housing portion Sa is shaped in the structure shaping step of step S140. Therefore, by performing the method for manufacturing a three-dimensional shaped object shown by the flowchart of FIG. 13, the housing portion Sa can be supported by the support T and shaped, and the deformation of the housing portion Sa can be prevented.

Further, the method for manufacturing a three-dimensional shaped object shown by the flowchart of FIG. includes the accommodating step of step S170 of accommodating the support T shaped via the support shaping step of step S130 in the housing portion Sa. That is, by performing the method for manufacturing a three-dimensional shaped object shown by the flowchart of FIG. 14, the structure shaping step of step S140 and the support shaping step of step S130 can be performed independently, and therefore the structure S and the support T can be shaped under an optimal condition.

Further, in the method for manufacturing a three-dimensional shaped object shown by the flowchart of FIG. 14, the support T is shaped via the support shaping step of step S130 at a position different from the shaping position of the housing portion Sa while the housing portion Sa is shaped in the structure shaping step of step S140. That is, by performing the method for manufacturing a three-dimensional shaped object shown by the flowchart of FIG. 14, the structure shaping step of step S140 and the support shaping step of step S130 can be performed at the same time, and manufacturing efficiency of the three-dimensional shaped object can be increased. However, the present disclosure is not limited to such the method for manufacturing a three-dimensional shaped object, and the structure shaping step of step S140 may be performed after the support shaping step of step S130 is performed, or the support shaping step of step S130 may be performed after the structure shaping step of step S140 is performed.

Further, the method for manufacturing a three-dimensional shaped object shown by the flowchart of FIGS. 13 and 14 includes the sintering step of step S220 of sintering the shaping material after the deresining step of step S210. That is, by performing the method for manufacturing a three-dimensional shaped object including the sintering step shown by the flowchart of FIGS. 13 and 14, the high-rigidity three-dimensional shaped object in which the metal powder or the ceramic powder is sintered can be shaped.

Further, the deresining step of step S210 in the method for manufacturing a three-dimensional shaped object shown by the flowchart of FIGS. 13 and 14 is a step of heating and vaporizing the support T. The support can be easily removed by heating and vaporizing the support T.

However, the method for manufacturing a three-dimensional shaped object according to the present disclosure is not limited to such a deresining step. For example, as the deresining step, a step of dissolving the support T with the solvent may be used. The support can be removed with high precision by dissolving the support T with the solvent.

Next, a specific example of the shaping material that can be used in the method for manufacturing a three-dimensional shaped object according to the present disclosure will be described. As a metal powder that can be contained in the shaping material, for example, simple powder of magnesium (Mg), iron (Fe), cobalt (Co) or chromium (Cr), aluminum (Al), titanium (Ti), copper (Cu), nickel (Ni), or powder of alloys containing one or more of these metals (maraging steel, stainless steel (SUS), cobalt chromium molybdenum, titanium alloy, nickel alloy, aluminum alloy, cobalt alloy, cobalt chromium alloy), and mixed powder thereof can be used.

In addition, as a ceramic powder that can be contained in the shaping material, for example, silicon dioxide, titanium dioxide, aluminum oxide, zirconium oxide, silicon nitride or the like can be preferably used.

Further, a specific example of the support material will be described. As a resin that can be used in the support material, for example, PMMA (acryl), ABS (acrylonitrile-butadiene-acrylate), ASA (acrylonitrile-styrene-acrylate), PLA (polylactic acid), PEI (polyetherimide), PC (polycarbonate), PP (polypropylene), PE (polyethylene), PA (polyamide), EP (epoxy), PPS (polyphenylene sulfide), PS (polystyrene), paraffin wax, and other thermoplastic resins can also be preferably used. Further, an ultraviolet curable resin of a type using a radical polymerization of an unsaturated double bond such as acryl or a type using a cationic polymerization such as epoxy can also be used.

Further, as a binder that can be contained in the shaping material, for example, polyvinyl alcohol, carboxymethyl cellulose, the polypropylene, the polyethylene, the polystyrene, polyoxymethylene, polymethyl methacrylate, the paraffin wax, or the like can be preferably used. Further, for example, the polyvinyl alcohol (PVA), acrylic resin, epoxy resin, silicone resin, cellulose resin or other synthetic resin or the PLA (polylactic acid), the PA (polyamide), the PPS (polyphenylene sulfide) or the other thermoplastic resin, or the like can be used alone or in combination.

Further, the shaping material and the support material may further include the solvent, as preferred solvents, for example, water; (poly) alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; and ionic liquids such as tetraalkylammonium acetates (for example, tetrabutylammonium acetate) or the like are included, and one or more selected from these solvents can be used in combination.

The present disclosure is not limited to the embodiment described above, and may be implemented by various configurations without departing from the scope thereof. For example, in order to solve apart or all of problems to be solved described above, or to achieve a part or all of the effects described above, technical characteristics in the embodiments corresponding to the technical characteristics in each embodiment described in the summary of the disclosure can be replaced or combined. In addition, when the technical characteristics are not described as essential in the present description, the technical characteristics can be deleted as appropriate.

Figure 21:
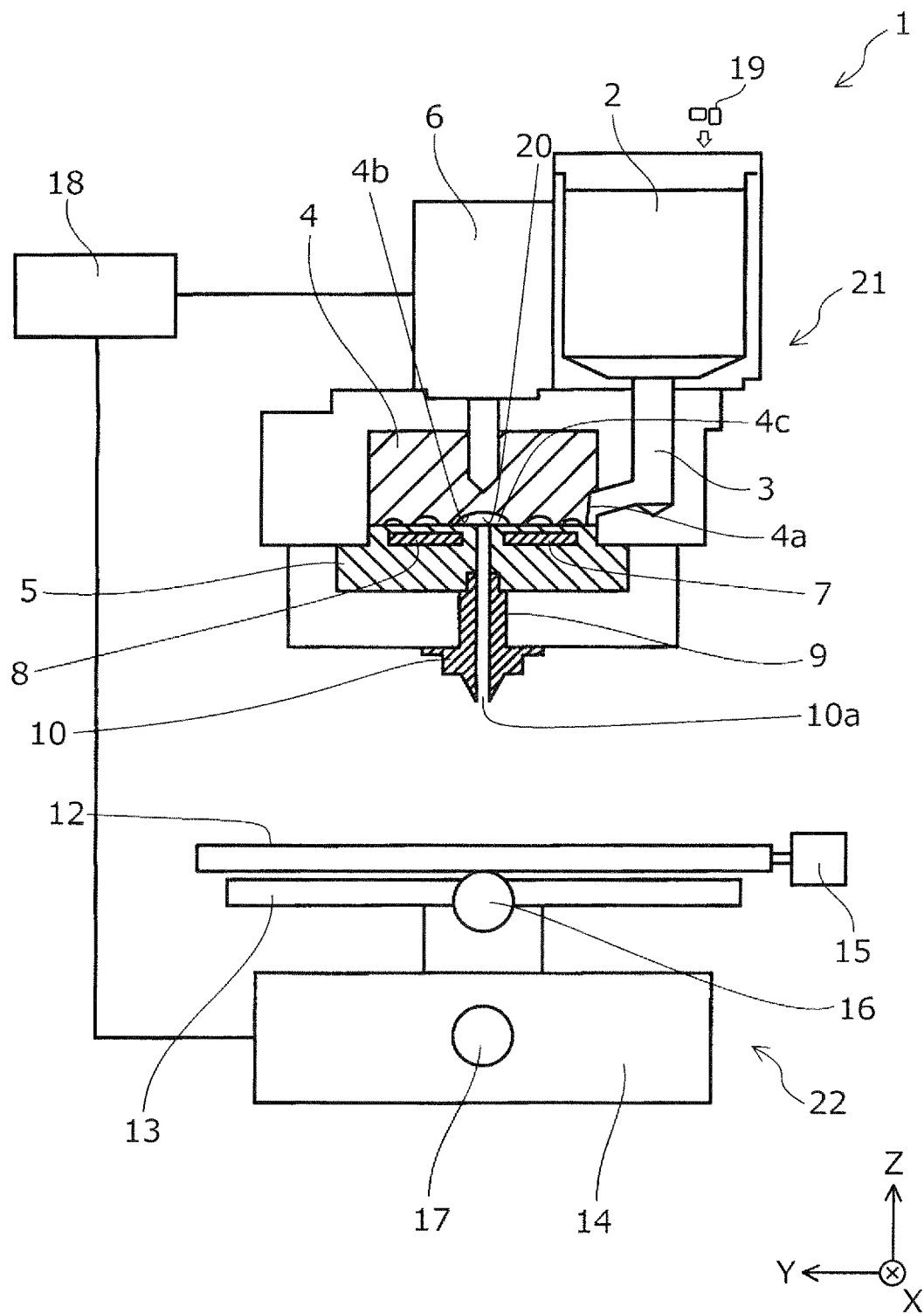
FIG. 21 is a schematic configuration diagram showing an example of a manufacturing device for three-dimensional shaped object capable of performing the method for manufacturing a three-dimensional shaped object according to the present disclosure, which is different from the manufacturing device for three-dimensional shaped object of FIG. 1.

For example, instead of the manufacturing apparatus 2000 for three-dimensional shaped object of FIG. 1, the method for manufacturing a three-dimensional shaped object according to the present disclosure may be performed using a manufacturing device 1 for three-dimensional shaped object shown in FIG. 21. In the manufacturing device 1 for three-dimensional shaped object, an injection unit 21 is formed with a hopper 2, a supply pipe 3, a flat screw 4, a barrel 5, a motor 6, and an injection portion 10. The manufacturing device 1 for three-dimensional shaped object of the present embodiment includes one injection unit 21 that injects the configuration material, whereas the manufacturing device 1 for three-dimensional shaped object may include a plurality of injection units 21 that inject the material M, or may include an injection unit 21 that injects the support material. Herein, the support material is a material for forming a layer of the support material for supporting the layer of the material M.

The device 1 includes a stage unit 22 for mounting a layer formed by being injected from the injection unit 21. The stage unit 22 includes a first stage 12 as a shaping stage on which the layer is actually mounted. The first stage 12 is configured to be able to change a position thereof along the Y direction by driving a first driving unit 15. Further, the stage unit 22 includes a second stage 13 on which the first stage 12 is mounted and whose position can be changed along the X direction by driving a second driving unit 16. The stage unit 22 includes a base unit 14 that can change the position of the second stage 13 along the Z direction by driving a third driving unit 17.

A barrel 5 is provided at a position facing a bottom surface of the flat screw 4 at a predetermined interval. A heater 7 and a heater 8 are provided in the vicinity of an upper surface of the barrel 5. With such a configuration of the flat screw 4 and the barrel 5, by rotating the flat screw 4, a pellet 19 is supplied to a space portion 20 formed by a notch 4*b* formed between the bottom surface of the flat screw 4 and the upper surface of the barrel 5, and moves from a circumferential surface 4*a* to a central portion 4*c*. When the pellet 19 moves in the space portion 20 formed by the notch 4*b*, the pellet 19 is melted or plasticized by heat of the heaters 7 and 8, and is pressurized by a pressure accompanying movement of the narrow space portion 20. In this way, the material M, which is fluidized by the plasticization of the pellet 19, is injected from a nozzle 10*a*. The injection portion 10 is configured to be capable of continuously injecting the material M from the nozzle 10*a*. The injection portion 10 is provided with a heater 9 for bringing the material M to a desired viscosity.

Further, as shown in FIG. 21, the manufacturing device 1 for three-dimensional shaped object is electrically coupled to a control unit 18 that controls various kinds of driving of the injection unit 21 and various kinds of driving of the stage unit 22.

What is claimed is:

1. A method for manufacturing a three-dimensional shaped object, comprising:
    a structure shaping step of shaping a structure with a shaping material including a metal powder or a ceramic powder;
    a support shaping step of shaping a support that supports the structure with a support material including a resin; and
    a deresining step of deresining the support supporting the structure,
    wherein the structure shaping step includes using the shaping material to form an exterior housing that includes the metal powder or the ceramic powder;
    the support shaping step includes forming the support within a volume defined by the exterior housing;
    after the exterior housing and the support within the volume defined by the exterior housing are formed, a lid formed of the metal powder or ceramic powder is formed that encloses the exterior housing with the support being positioned within the volume defined by the exterior housing; and
    the support within the exterior housing includes an upper surface that contacts the lid and a lower surface that is not in contact with the lid, the upper surface and the lower surface each having a mesh shape, and the mesh shape of the upper surface is more densely formed in comparison to the mesh shape of the lower surface.

2. The method for manufacturing a three-dimensional shaped object according to claim 1 wherein
    the support is shaped via the support shaping step at a position different from a shaping position of the exterior housing while the exterior housing is shaped in the structure shaping step.

3. The method for manufacturing a three-dimensional shaped object according to claim 1, further comprising:
    a sintering step of sintering the shaping material after the deresining step.

4. The method for manufacturing a three-dimensional shaped object according to claim 1, wherein
    the deresining step is a step of heating and vaporizing the support.

5. The method for manufacturing a three-dimensional shaped object according to claim 1, wherein
    the deresining step is a step of dissolving the support with a solvent.

* * * * *